US009813864B2

(12) United States Patent
Dvortsov et al.

(10) Patent No.: US 9,813,864 B2
(45) Date of Patent: Nov. 7, 2017

(54) DETECTING STOWING OR UNSTOWING OF A MOBILE DEVICE

(71) Applicant: Apple Inc., Cupertino, CA (US)

(72) Inventors: Eugene Dvortsov, San Francisco, CA (US); David J. Shoemaker, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/034,164

(22) PCT Filed: Nov. 4, 2013

(86) PCT No.: PCT/US2013/068329
§ 371 (c)(1),
(2) Date: May 3, 2016

(87) PCT Pub. No.: WO2015/065494
PCT Pub. Date: May 7, 2015

(65) Prior Publication Data
US 2016/0277891 A1   Sep. 22, 2016

(51) Int. Cl.
*H04W 4/02* (2009.01)
*H04W 4/00* (2009.01)
(Continued)

(52) U.S. Cl.
CPC .......... *H04W 4/023* (2013.01); *H04W 4/008* (2013.01); *H04W 4/027* (2013.01); *H04W 4/12* (2013.01); *H04W 8/22* (2013.01)

(58) Field of Classification Search
CPC ... A61B 5/681; A61B 5/02427; A61B 5/0002; A61B 5/4812; A61B 5/1118; A61B 5/6802; A61B 5/02444; A61B 5/0022; A61B 5/021; A61B 5/4809; H04W 4/008; H04W 4/027; H04W 12/06; H04W 4/22; H04W 52/0209; G06F 1/163; G06F 21/35; G06F 21/34; G06F 2221/2149; G06F 2209/544; G01S 19/19; H04N 21/42201;
(Continued)

(56) References Cited

U.S. PATENT DOCUMENTS

2008/0140868 A1   6/2008   Kalayjian et al.
2012/0139690 A1   6/2012   Gupta et al.
(Continued)

OTHER PUBLICATIONS

International Search Report and Written Opinion dated Aug. 18, 2014, in U.S. International Application No. PCT/US2013/068329. 12 pages.

*Primary Examiner* — Nizar Sivji
(74) *Attorney, Agent, or Firm* — Kilpatrick Townsend & Stockton LLP

(57) ABSTRACT

A mobile device can communicate with a wearable device to automatically detect when a stowed mobile device becomes unstowed and/or when a mobile device that is in use become stowed. Detection of stowing or unstowing of the mobile device can be based on comparison of data from sensors such as proximity sensors, motion sensors, and/or other environmental sensors between devices. When unstowing is detected, the mobile device can prepare itself for use based in part on context information provided by the wearable device, e.g., by activating a user interface component and/or launching an app based on the context information. When stowing is detected, the mobile device can inactivate a user interface component.

20 Claims, 12 Drawing Sheets

(51) Int. Cl.
*H04W 4/22* (2009.01)
*H04W 4/12* (2009.01)
*H04W 8/22* (2009.01)

(58) Field of Classification Search
CPC ............ H04R 2460/01; H04R 2225/43; H05B 37/029; G08B 21/0446; G08B 21/0453; G08B 25/008; G09F 3/005; H04B 1/385
See application file for complete search history.

(56) References Cited

U.S. PATENT DOCUMENTS

2012/0289213 A1 11/2012 Levien et al.
2013/0288603 A1 10/2013 Iwasaki

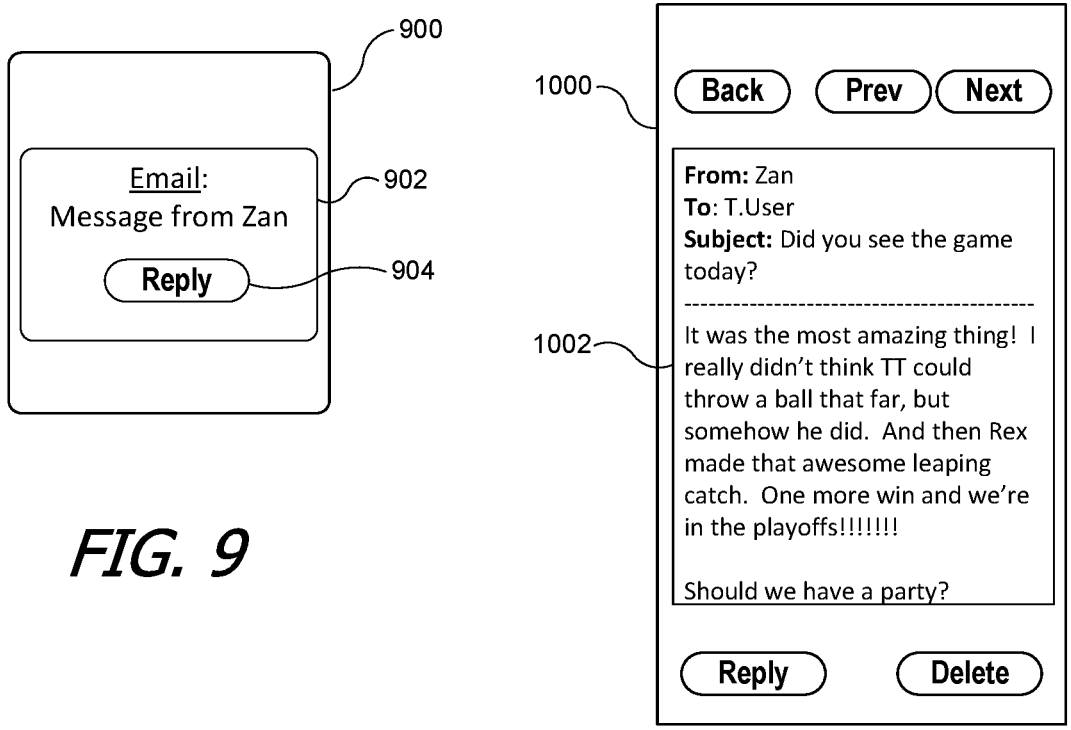
FIG. 9
FIG. 10
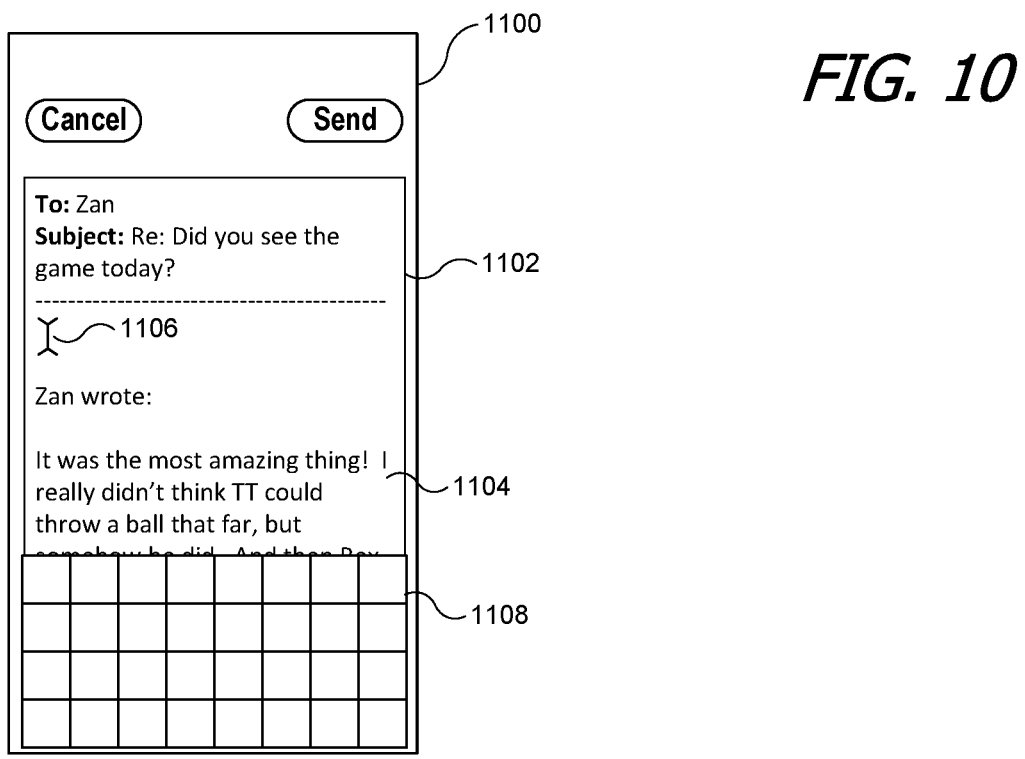
FIG. 11

DETECTING STOWING OR UNSTOWING OF A MOBILE DEVICE

CROSS-REFERENCE TO RELATED APPLICATION

This application is the U.S. National Phase of PCT Application No. PCT/US2013/068329, filed Nov. 4, 2013, the disclosure of which is incorporated herein by reference in its entirety.

BACKGROUND

The present disclosure relates generally to wearable electronic devices and in particular to using a wearable device to detect removal of a mobile device from a location where it has been stowed (such as a pocket or bag) and/or replacement of a mobile device into such a location.

Mobile electronic devices, such as mobile phones, smart phones, tablet computers, media players, and the like, have become quite popular. Many users carry a device almost everywhere they go and use their devices for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information).

Because users often need their hands for other purposes, they generally do not keep their mobile devices in hand at all times. It is common for users to stow their devices in various locations. (The term "stowage" is used herein to refer to any location where a device might be stowed.) For instance, at various times a user may stow a mobile phone or other mobile device in a pocket, a purse, a briefcase, a backpack, or the like, which allows the device to be carried without encumbering the user's hands. At other times, a user may stow a mobile device on a desk, table, chair, floor, or other surface. The user unstows the device when she wants to interact with it.

SUMMARY

Many mobile devices can go into an inactive state when unused for a period of time, such as often happens when a user stows a device. In an inactive state, the device may, for example, power down user interface components or other components to conserve power; the device may also "lock" its user interface such that the user is required to present a credential (e.g., enter a passcode) prior to operating the device. A user who picks up a stowed mobile device typically has to operate a control (e.g., press a wake-up button) and present a credential (assuming the device is locked) in order to return the device to active state prior to interacting with it. This can make mobile devices less convenient to use. Conversely, if the user does not remember to return the mobile device to an inactive state before stowing it after use, the mobile device may be inadvertently operated, e.g., by bumping against other objects in the user's bag or pocket. This can waste battery power and/or result in unintended actions of which the user might not even be aware, such as placing phone calls or inadvertently modifying data stored on the device.

Certain embodiments of the present invention can facilitate user interaction with a mobile device by automatically detecting when a stowed mobile device becomes unstowed (removed from a stowage location) and/or when a mobile device that is in use become stowed (placed in a stowage location). Such detection can be accomplished, e.g., using a wearable device that is capable of communicating with the user's mobile device. The wearable device, which can be physically attached to the user's person (e.g., by a strap or clip or the like) during use, and the mobile device can communicate to determine when the user has unstowed the mobile device, and in response to this determination, the mobile device can prepare itself for user interaction. For instance, the mobile device can activate its user interface and/or unlock itself.

The determination of when a mobile device has been unstowed can be based on sensor data available from either or both of the mobile device and the wearable device. For instance, one or both of the devices may have sensors (e.g., Bluetooth LE sensors) capable of determining the proximity to the other device. To the extent it can be assumed that a user intending to operate the mobile device would bring it into close proximity (e.g., within a few inches) to the wearable device, coming into close proximity can be an indicator that the mobile device is being unstowed. In addition or instead, the wearable device and the mobile device can both have accelerometers or other motion sensors. To the extent it can be assumed that the wearable device and the mobile device would experience corresponding motions when the user is operating the mobile device, correlations between motion-sensor data from the two devices can be an indicator that the mobile device is being unstowed. In various embodiments, data from any type of environmental sensor (e.g., ambient light sensors, ambient noise sensors) that both devices have can be correlated between the two devices and used to infer an unstowing event. The reliability of correlations between data from sensors of any particular type may depend on the likelihood that the sensor data from the two devices would be different when the mobile device is stowed and similar when the mobile device is not stowed; in some embodiments, data from multiple sensors can be analyzed to determine whether the mobile device is being removed from stowage. As another example, the mobile device may be able to detect events characteristic of being removed from stowage (e.g., a distinctive pattern of accelerations as the user grasps and moves the device from stowage to a location where the user can see it). A removal from stowage indicated by the mobile device's sensors can be confirmed, e.g., based on sensor-data correlations with the wearable device or other information available on the wearable device.

In some embodiments, in response to detection of an unstowing event, the mobile device can prepare itself for use based in part on context information provided by the wearable device. For example, the wearable device may have recently presented information (e.g., an alert about an incoming message or call) to the user and/or received input from the user (e.g., a request to view or create content, such as replying to an email). The wearable device can provide to the mobile device context information indicating its own state (e.g., what information it is presenting or what user input has been received), and from this information, the mobile device can infer the user's likely intent in removing the mobile device from stowage and prepare itself accordingly. Thus, for example, if the wearable device has alerted the user to an incoming message that is viewable using a social networking app, the mobile device can prepare itself by launching the social networking app and navigating to a screen that displays the incoming message.

In some embodiments, the wearable device and mobile device can also communicate to detect when the user stows the mobile device. Similarly to detecting unstowing events, the devices can use correlations, or loss of correlations, between data from corresponding sensors of the two devices; decreased proximity between the devices; and/or other information to determine that the user has stowed the mobile device. In response to determining that the mobile device has been stowed, the mobile device's user interface can be powered down, the device can be placed in a locked state, and/or other actions can be taken to prevent inadvertent or unauthorized operation of the mobile device.

Some embodiments of the invention relate to methods for detecting unstowing of a mobile device using a wearable device. For example, while the mobile device is in an inactive state, the wearable device can obtain sensor data, including motion-sensor data from the mobile device. The wearable device can compare the mobile-device motion-sensor data to its own local motion-sensor data and determine whether the mobile device has been unstowed. If so, the wearable device can send an activate message and/or context information to the mobile device. The activate message can be any message indicating that the mobile device should enter an active state that permits user interaction with the mobile device, and the context information can include any information indicative of activity (e.g., most recent activity) of a user interface of the wearable device. For example, the context information can include information descriptive of an alert displayed on the wearable device and/or information descriptive of a user-interface control operated at the wearable device. In some embodiments, detection of unstowing or sending of an activation message can occur only when the mobile device is in close proximity to the wearable device. In some embodiments, the wearable device can initiate obtaining and analyzing of motion-sensor data from the mobile device in response to a notification message from the mobile device indicating that the mobile device has detected a candidate unstowing event; the wearable device can verify the candidate unstowing event.

Some embodiments relate to other methods for detecting unstowing of a mobile device using a wearable device. For example, the wearable device can provide sensor data (e.g., motion-sensor data) to the mobile device. While in an inactive state consistent with being stowed, the mobile device can compare the sensor data and determine whether unstowing has occurred. In some embodiments, the mobile device can monitor its own sensor data to detect a candidate unstowing event and request sensor data from the wearable device to verify the unstowing event, and in some embodiments, sensor data from the wearable device is used only if the wearable device is in close proximity to the mobile device. If unstowing is detected, the mobile device can obtain (e.g., by requesting and receiving a response) context information from the wearable device and can prepare its own user interface for a user interaction based at least in part on the context information from the wearable device. The mobile device can also enter the active state, e.g., by activating a user interface component and/or unlocking itself. In some embodiments, the mobile device can also make further preparations for the user based on the context information, e.g., by identifying and launching a context-appropriate app. For instance, if the context information pertains to an alert, the mobile device can launch an app that can present a content item pertaining to the alert; if the context information pertains to a user input received at the wearable device, the mobile device can launch an app that can present a user interface responsive to the input.

Some embodiments relate to detection of stowing of a mobile device using a wearable device. For instance, while the mobile device is in an active state, the wearable device can receive sensor data (e.g., motion-sensor data) from the mobile device and can compare the mobile device's motion-sensor data to its own local motion-sensor data in order to determine whether the mobile device has been stowed. If the mobile device has been stowed, the wearable device can send an inactivate message to the mobile device, indicating that the mobile device should enter an inactive state that restricts user interaction with the mobile device. As with detecting unstowing events, in some embodiments, the wearable device can provide motion-sensor data to the mobile device, and the mobile device can compare the wearable device's data to its own local data in order to determine whether the mobile device has been stowed.

Some embodiments relate to wearable devices. For example, a wearable device can include a motion sensor configured to provide local motion data, a proximity sensor, a communication interface configured to communicate with a mobile device, and a processing subsystem coupled to the motion sensor, the proximity sensor, and the communication interface. The processing subsystem can be configured to detect close proximity between the mobile device and the wearable device, obtain motion-sensor data from the mobile device, determine whether the mobile device has been unstowed, and in the event that the mobile device has been unstowed, send an activation message to the mobile device indicating that the mobile device should enter an active state. In some embodiments, the wearable device can also include a user interface component (e.g., a touchscreen), and the processing subsystem can provide to the mobile device context information reflecting a recent activity at the user interface component, e.g., information reflecting a most recent alert presented on the touchscreen and/or information reflecting a most recent touchscreen input control operated by the user.

Some embodiments relate to mobile devices. For example, a mobile device can include a user interface component, a motion sensor configured to provide local motion data, a communication interface configured to communicate with a wearable device, and a processing subsystem coupled to the user interface component, the motion sensor, and the communication interface. The processing subsystem can be configured to receive, while the mobile device is in an inactive state, a request from the wearable device for motion-sensor data, provide the data, receive an activation message indicating that the mobile device should enter an active state and context information, and in response to the activation message, prepare the user interface component for a user interaction based at least in part on the context information and enter an active state that permits user interaction with the user interface component. The processing subsystem can also be configured to receive, while the mobile device is in the active state, an inactivation message indicating that the mobile device should enter the inactive state and to enter the inactive state in response to the inactivation message.

The following detailed description together with the accompanying drawings will provide a better understanding of the nature and advantages of the present invention.

BRIEF DESCRIPTION OF THE DRAWINGS

In FIG. 4A, the user is reaching into a pocket, and in FIG. 4B, the mobile device has been removed from the pocket and positioned for use.

In FIG. 5A, the user 500 is reaching into a bag, and in FIG. 5B, the mobile device user has been removed from the bag and positioned for use.

FIGS. 7-11 show examples of selecting a user interface screen according to various embodiments of the present invention FIG. 7 shows a user interface screen for a wearable device according to an embodiment of the present invention.

FIG. 8 shows a user interface screen for a mobile device according to an embodiment of the present invention.

FIG. 9 shows another user interface screen for a wearable device according to an embodiment of the present invention.

FIG. 10 shows another user interface screen for a mobile device according to an embodiment of the present invention.

FIG. 11 shows another user interface screen for a mobile device according to an embodiment of the present invention.

DETAILED DESCRIPTION

Certain embodiments of the present invention can facilitate user interaction with a mobile device by automatically detecting when a stowed mobile device becomes unstowed (removed from a stowage location) and/or when a mobile device that is in use become stowed (placed in a stowage location). Such detection can be accomplished, e.g., using a wearable device that is capable of communicating with the user's mobile device. The wearable device, which can be physically attached to the user's person (e.g., by a strap or clip or the like) during use, and the mobile device can communicate to determine when the user has unstowed the mobile device, and in response to this determination, the mobile device can prepare itself for user interaction. For instance, the mobile device can activate its user interface and/or unlock itself.

Figure 1:
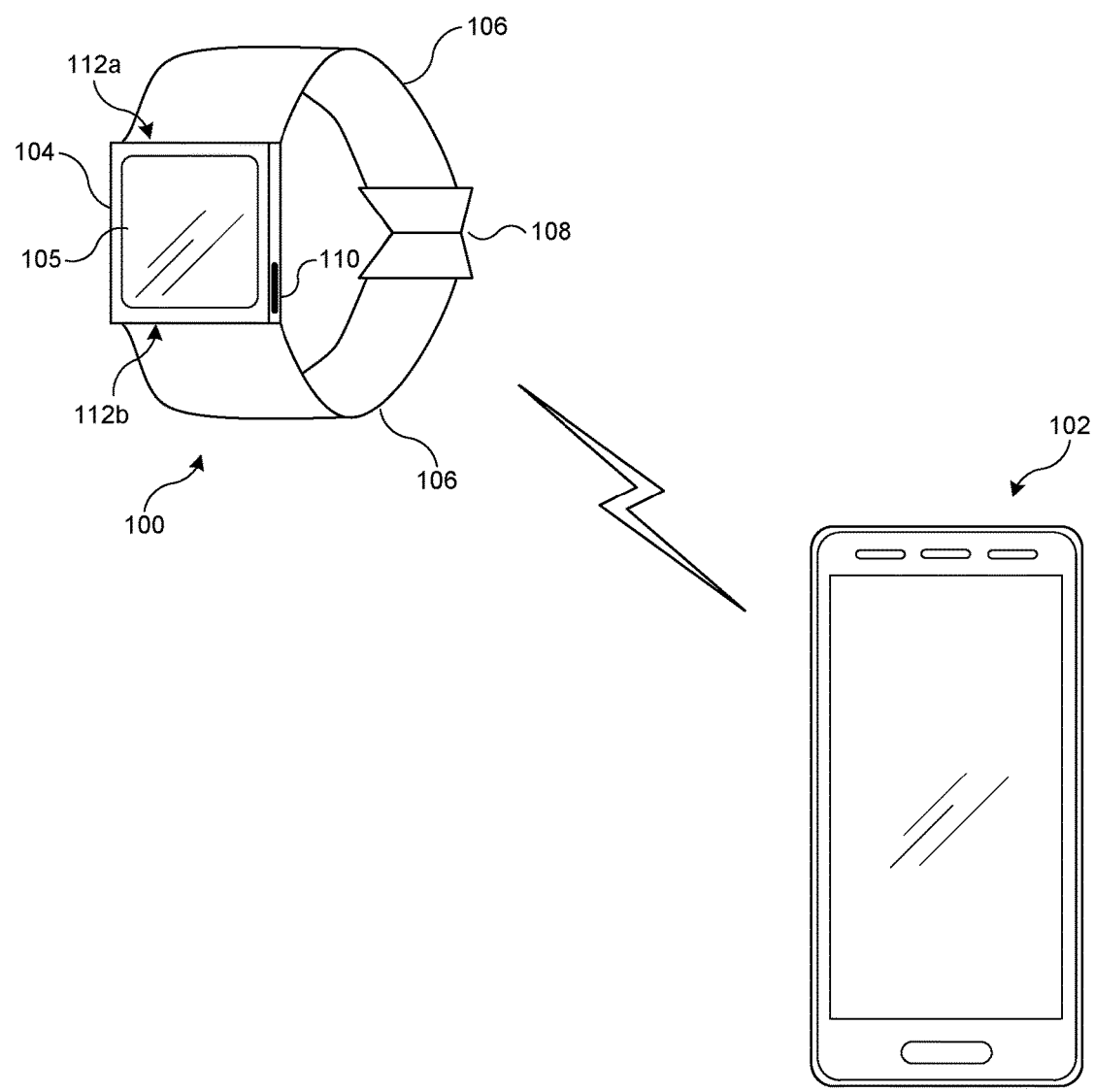
FIG. 1 shows a wearable device communicating wirelessly with a mobile device according to an embodiment of the present invention.

FIG. 1 shows a wearable device 100 communicating wirelessly with a mobile device 102 according to an embodiment of the present invention. In this example, wearable device 100 is shown as a wristwatch-like device with a face portion 104 connected to a strap 106.

Face portion 104 can include, e.g., a touchscreen display 105 that can be appropriately sized depending on where on a user's person wearable device 100 is intended to be worn. A user can view information presented by wearable device 100 on touchscreen display 105 and provide input to wearable device 100 by touching touchscreen display 105. In some embodiments, touchscreen display 105 can occupy most or all of the front surface of face portion 104.

Strap 106 (also referred to herein as a wristband or wrist strap) can be provided to allow device 100 to be removably worn by a user, e.g., around the user's wrist. In some embodiments, strap 106 can be made of any flexible material (e.g., fabrics, flexible plastics, leather, chains or flexibly interleaved plates or links made of metal or other rigid materials) and can be connected to face portion 104, e.g., by hinges, loops, or other suitable attachment devices or holders. Alternatively, strap 106 can be made of two or more sections of a rigid material joined by a clasp 108. One or more hinges can be positioned at the junction of face 104 and proximal ends 112a, 112b of strap 106 and/or elsewhere along the lengths of strap 106 to allow a user to put on and take off wearable device 100. Different portions of strap 106 can be made of different materials; for instance, flexible or expandable sections can alternate with rigid sections. In some embodiments, strap 106 can include removable sections, allowing wearable device 100 to be resized to accommodate a particular user's wrist size. In some embodiments, strap 106 can be a continuous strap member that runs behind or through face portion 104. Face portion 104 can be detachable from strap 106, permanently attached to strap 106, or integrally formed with strap 106.

In some embodiments, strap 106 can include a clasp 108 that facilitates connection and disconnection of distal ends of strap 106. In various embodiments, clasp 108 can include buckles, magnetic clasps, mechanical clasps, snap closures, etc. In some embodiments, a clasp member can be movable along at least a portion of the length of strap 106, allowing wearable device 100 to be resized to accommodate a particular user's wrist size. Accordingly, device 100 can be secured to a user's person, e.g., around the user's wrist, by engaging clasp 108; clasp 108 can be subsequently disengaged to facilitate removal of device 100 from the user's person.

In other embodiments, strap 106 can be formed as a continuous band of an elastic material (including, e.g., elastic fabrics, expandable metal links, or a combination of elastic and inelastic sections), allowing wearable device 100 to be put on and taken off by stretching a band formed by strap 106 connecting to face portion 104. Thus, clasp 108 is not required.

Strap 106 (including any clasp that may be present) can include sensors that allow wearable device 100 to determine whether it is being worn at any given time. Wearable device 100 can operate differently depending on whether it is currently being worn or not. For example, wearable device 100 can inactivate various user interface and/or RF interface components when it is not being worn. In addition, in some embodiments, wearable device 100 can notify mobile device 102 when a user puts on or takes off wearable device 100. Further, strap 106 can include sensors capable of detecting wrist articulations of a user wearing device 100; examples of such sensors are described below.

Mobile device 102 can be any device that communicates with wearable device 100 and that a user might carry from place to place and use in different places. For example, mobile device 102 can be a handheld device that is designed to be held in a user's hand during use and stowed somewhere (e.g., in a pocket or bag) when not in use. In FIG. 1, mobile device 102 is shown as a smart phone; however, other devices can be substituted, such as a tablet computer, a media player, any type of mobile phone or other handheld computing and/or communication device, a laptop computer, or the like. In some embodiments, wearable device 100 can also communicate with other host devices that are not necessarily mobile, such as desktop computer systems, point-of-sale terminals, security systems, environmental control systems, and so on. Mobile device 102 (and any other host devices) can communicate wirelessly with wearable device 100, e.g., using protocols such as Bluetooth or Wi-Fi. In some embodiments, wearable device 100 can include an electrical connector 110 that can be used to provide a wired connection to mobile device 102 and/or to other devices, e.g., by using suitable cables. For example, connector 110 can be used to connect to a power supply to charge an onboard battery of wearable device 100.

In some embodiments, wearable device 100 and mobile device 102 can interoperate to enhance functionality available on mobile device 102. For example, wearable device 100 and mobile device 102 can establish a pairing using a wireless communication technology such as Bluetooth. While the devices are paired, mobile device 102 can send notifications of selected events (e.g., receiving a phone call, text message, or email message) to wearable device 100, and wearable device 100 can present corresponding alerts to the user. Wearable device 100 can also provide an input interface via which a user can respond to an alert (e.g., to answer a phone call or reply to a text message). In some embodiments, wearable device 100 can also provide a user interface that allows a user to initiate an action on mobile device 102, such as unlocking mobile device 102 or turning on its display screen, placing a phone call, sending a text message, or controlling media playback operations of mobile device 102.

In some embodiments, wearable device 100 and mobile device 102 can interoperate to detect stowing and/or unstowing of mobile device 102 based on sensor data from the two devices; when stowing is detected, mobile device 102 can transition to an inactive state (e.g., user interface powered down, device locked), and when unstowing is detected, mobile device 102 can transition to an active state (e.g., user interface powered up and presenting information, device unlocked). Further, when unstowing is detected, wearable device 100 can provide information about its current operating context to mobile device 102, and mobile device 102 can prepare itself for user interaction based on the context information received from wearable device 100.

It will be appreciated that wearable device 100 and mobile device 102 are illustrative and that variations and modifications are possible. For example, wearable device 100 can be implemented in a variety of wearable articles, including a watch, a bracelet, or the like. In some embodiments, wearable device 100 can be operative regardless of whether mobile device 102 is in communication with wearable device 100.

Figure 2:
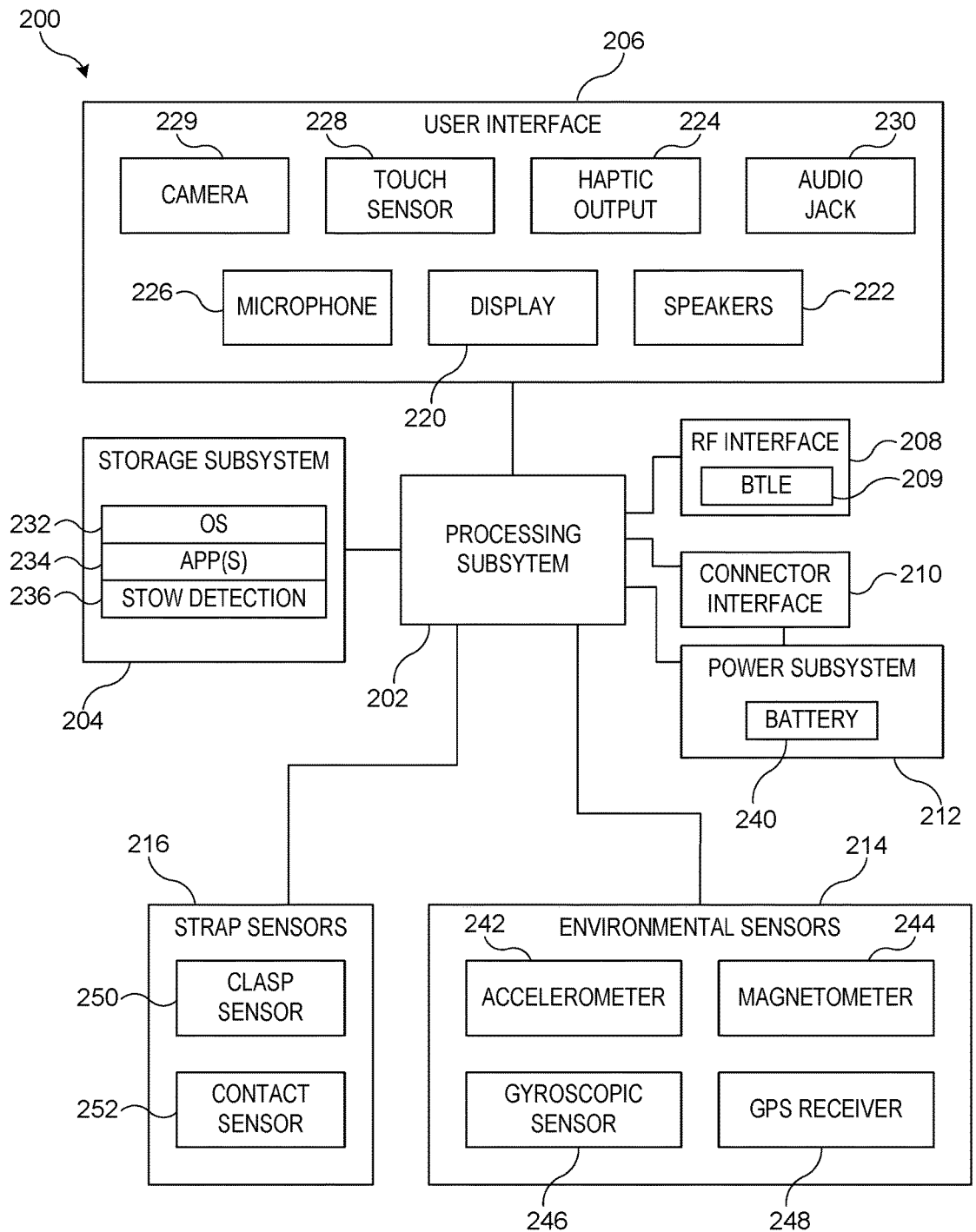
FIG. 2 is a simplified block diagram of a wearable device according to an embodiment of the present invention.

Wearable device 100 can be implemented using electronic components disposed within face portion 104 and/or strap 106. FIG. 2 is a simplified block diagram of a wearable device 200 (e.g., implementing wearable device 100) according to an embodiment of the present invention. Wearable device 200 can include processing subsystem 202, storage subsystem 204, user interface 206, RF interface 208, connector interface 210, power subsystem 212, environmental sensors 214, and strap sensors 216. Wearable device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 204 can also store one or more application programs (or apps) 234 to be executed by processing subsystem 202 (e.g., video game programs, personal information management programs, media playback programs, interface programs associated with particular host devices and/or host device functionalities, etc.).

User interface 206 can include any combination of input and output devices. A user can operate input devices of user interface 206 to invoke the functionality of wearable device 200 and can view, hear, and/or otherwise experience output from wearable device 200 via output devices of user interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing wearable device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing wearable device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface (e.g., touchscreen interface 105 of FIG. 1), and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by wearable device 200 to other devices for storage. Depending on implementation, the optical components can provide fixed focal distance or variable focal distance; in the latter case, autofocus can be provided. In some embodiments, camera 229 can be disposed along an edge of face member 104 of FIG. 1, e.g., the top edge, and oriented to allow a user to capture images of nearby objects in the environment such as a bar code or QR code. In other embodiments, camera 229 can be disposed on the front surface of face member 104, e.g., to capture images of the user. Zero, one, or more cameras can be provided, depending on implementation.

In some embodiments, user interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing system 202 can control the operation of wearable device 200. In various embodiments, processing subsystem 202 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for wearable device 200. For example, in some embodiments, processing subsystem 202 can execute an operating system (OS) 232 and various applications 234 such as a phone-interface application, a text-message-interface application, a media interface application, a fitness application, and/or other applications. In some embodiments, some or all of these application programs can interact with a host device, e.g., by generating messages to be sent to the host device and/or by receiving and interpreting messages from the host device. In some embodiments, some or all of the application programs can operate locally to wearable device 200. For example, if wearable device 200 has a local media library stored in storage subsystem 204, a media interface application can provide a user interface to select and play locally stored media items.

Processing subsystem 202 can also execute stowage detection code 236 (which can be part of OS 232 or separate as desired). In some embodiments, execution of stowage detection code 236 can cause wearable device 200 to receive sensor data from mobile device 102, compare the received sensor data to its own ("local") sensor data, and determine whether stowing or unstowing of mobile device 102 has occurred. In other embodiments, execution of stowage detection code 236 can cause wearable device 200 to send sensor data to mobile device 102 in response to a request, and mobile device 102 can use the sensor data to determine whether stowing or unstowing of mobile device 102 has occurred. When unstowing is detected, execution of stowage detection code 236 can further cause wearable device 200 to provide information about its current operating context to mobile device 102. Examples of specific processes that can be implemented using stowage detection code 236 are described below.

RF (radio frequency) interface 208 can allow wearable device 200 to communicate wirelessly with various host devices. RF interface 208 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. In some embodiments, RF interface 208 can implement a Bluetooth LE (Low energy) proximity sensor 209 that supports proximity detection through an estimation of signal strength and/or other protocols for determining proximity to another electronic device. In some embodiments, RF interface 208 can provide near-field communication ("NFC") capability, e.g., implementing the ISO/IEC 18092 standards or the like; NFC can support wireless data exchange between devices over a very short range (e.g., 20 centimeters or less). RF interface 208 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 208.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery. For example, connector interface 210 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from host device 202 in analog and/or digital formats.

In some embodiments, connector interface 210 and/or RF interface 208 can be used to support synchronization operations in which data is transferred from a host device to wearable device 200 (or vice versa). For example, a user may be able to customize settings and other information for wearable device 200. While user interface 206 can support data-entry operations, a user may find it more convenient to define customized information on a separate device (e.g., a tablet or smartphone) that has a larger interface (e.g., including a real or virtual alphanumeric keyboard), then transfer the customized information to wearable device 200 via a synchronization operation. Synchronization operations can also be used to load and/or update other types of data in storage subsystem 204, such as media items, application programs, personal data, and/or operating system programs. Synchronization operations can be performed in response to an explicit user request and/or automatically, e.g., when wireless device 200 resumes communication with a particular host device or in response to either device receiving an update to its copy of synchronized information.

Environmental sensors 214 can include various electronic, mechanical, electromechanical, optical, or other devices that provide information related to external conditions around wearable device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope 246, and a GPS receiver 248.

Some environmental sensors can provide information about the location and/or motion of wearable device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical systems) gyroscopes and related control and sensing circuitry. Global Positioning System (GPS) receiver 248 can determine location based on signals received from GPS satellites.

Other sensors can also be included in addition to or instead of these examples. For example, a sound sensor can incorporate microphone 226 together with associated circuitry and/or program code to determine, e.g., a decibel level of ambient sound. Temperature sensors, proximity sensors, ambient light sensors, or the like can also be included.

Strap sensors 216 can include various electronic, mechanical, electromechanical, optical, or other devices that provide information as to whether wearable device 200 is currently being worn. In some embodiments, certain features of wearable device 200 can be selectively enabled or disabled depending on whether wearable device 200 is currently being worn. For example, the techniques described below for detecting stowing or unstowing of an associated mobile device may be operative only while wearable device 200 is continuously worn.

Power subsystem 212 can provide power and power management capabilities for wearable device 200. For example, power subsystem 212 can include a battery 240 (e.g., a rechargeable battery) and associated circuitry to distribute power from battery 240 to other components of wearable device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

In some embodiments, power subsystem 212 can control power distribution to components within wearable device 200 to manage power consumption efficiently. For example, power subsystem 212 can automatically place device 200 into a "hibernation" state when strap sensors 216 or other sensors indicate that device 200 is not being worn. The hibernation state can be designed to reduce power consumption; accordingly, user interface 206 (or components thereof), RF interface 208, connector interface 210, and/or environmental sensors 214 can be powered down (e.g., to a low-power state or turned off entirely), while strap sensors 216 are powered up (either continuously or at intervals) to detect when a user puts on wearable device 200. As another example, in some embodiments, while wearable device 200 is being worn, power subsystem 212 can turn display 220 and/or other components on or off depending on motion and/or orientation of wearable device 200 detected by environmental sensors 214.

Power subsystem 212 can also provide other power management capabilities, such as regulating power consumption of other components of wearable device 200 based on the source and amount of available power, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that wearable device 200 is illustrative and that variations and modifications are possible. For example, strap sensors 216 can be modified, and wearable device 200 can include a user-operable control (e.g., a button or switch) that the user can operate to provide input. Controls can also be provided, e.g., to turn on or off display 220, mute or unmute sounds from speakers 222, etc. Wearable device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 2 be implemented in a given embodiment of a wearable device.

Figure 3:
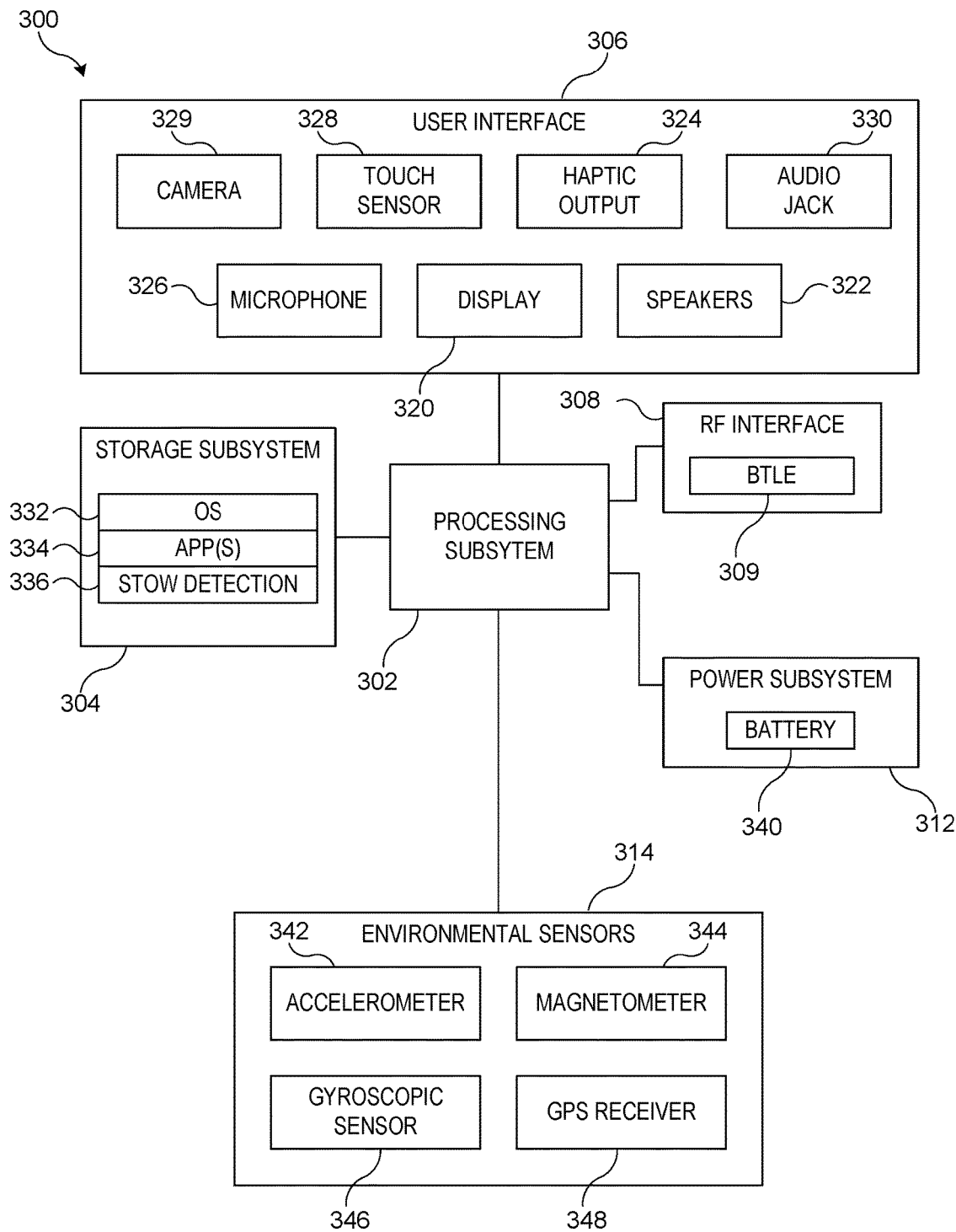
FIG. 3 is a simplified block diagram of a mobile device according to an embodiment of the present invention.

A mobile device such as mobile device 102 of FIG. 1 can be implemented as an electronic device using blocks similar to those described above (e.g., processors, storage media, user interface devices, data communication interfaces, etc.) and/or other blocks or components. FIG. 3 is a simplified block diagram of a mobile device 300 (e.g., implementing mobile device 102 of FIG. 1) according to an embodiment of the present invention. Mobile device 300 can include processing subsystem 302, storage subsystem 304, user interface 306, RF interface 308, power subsystem 312, and environmental sensors 314. Mobile device 300 can also include other components (not explicitly shown). Many of the components of mobile device 300 can be similar or identical to those of wearable device 200 of FIG. 2.

For instance, storage subsystem 304 can be generally similar to storage subsystem 204 and can include, e.g., using magnetic storage media, flash memory, other semiconductor memory (e.g., DRAM, SRAM), or any other non-transitory storage medium, or a combination of media, and can include volatile and/or non-volatile media. Like storage subsystem 204, storage subsystem 304 can be used to store data and/or program code to be executed by processing subsystem 302.

User interface 306 can include any combination of input and output devices. A user can operate input devices of user interface 306 to invoke the functionality of mobile device 300 and can view, hear, and/or otherwise experience output from mobile device 300 via output devices of user interface 306. Examples of output devices include display 320, speakers 322, and haptic output generator 324. Examples of input devices include microphone 326, touch sensor 328, and camera 329. These input and output devices can be similar to output devices described above with reference to FIG. 2.

Processing subsystem 302 can be implemented as one or more integrated circuits, e.g., one or more single-core or multi-core microprocessors or microcontrollers, examples of which are known in the art. In operation, processing system 302 can control the operation of mobile device 300. In various embodiments, processing subsystem 302 can execute a variety of programs in response to program code and can maintain multiple concurrently executing programs or processes. At any given time, some or all of the program code to be executed can be resident in processing subsystem 302 and/or in storage media such as storage subsystem 304.

Through suitable programming, processing subsystem 302 can provide various functionality for mobile device 300. For example, in some embodiments, processing subsystem 302 can execute an operating system (OS) 332 and various applications 334 such as a phone-interface application, a text-message-interface application, a media interface application, a fitness application, and/or other applications. In some embodiments, some or all of these application programs can interact with a wearable device, e.g., by generating messages to be sent to the wearable device and/or by receiving and interpreting messages from the wearable device. In some embodiments, some or all of the application programs can operate locally to mobile device 300.

Processing subsystem 302 can also execute stowage detection code 336 (which can be part of OS 332 or separate as desired). In some embodiments, execution of stowage detection code 336 can cause mobile device 300 to receive sensor data from a wearable device (e.g., wearable device 100 of FIG. 1), compare the received sensor data to its own ("local") sensor data, and determine whether stowing or unstowing of mobile device 300 has occurred. In other embodiments, execution of stowage detection code 336 can cause mobile device 300 to send sensor data to wearable device 100, and wearable device 100 can use the sensor data to determine whether stowing or unstowing of mobile device 302 has occurred, with mobile device 300 receiving a notification from wearable device 100 if stowing or unstowing is detected. When unstowing is detected, execution of stowage detection code 336 can further cause mobile device 300 to receive information about the current operating context of wearable device 100. Examples of specific processes that can be implemented using stowage detection code 336 are described below.

RF (radio frequency) interface 308 can allow mobile device 300 to communicate wirelessly with various other devices and networks. RF interface 308 can include RF transceiver components such as an antenna and supporting circuitry to enable data communication over a wireless medium, e.g., using cellular voice and/or data networks, Wi-Fi (IEEE 802.11 family standards), Bluetooth® (a family of standards promulgated by Bluetooth SIG, Inc.), or other protocols for wireless data communication. In some embodiments, RF interface 308 can implement a Bluetooth LE (Low energy) proximity sensor 309 that supports proximity detection through an estimation of signal strength and/or other protocols for determining proximity to another electronic device. In some embodiments, RF interface 308 can provide near-field communication ("NFC") capability, e.g., implementing the ISO/IEC 18092 standards or the like; NFC can support wireless data exchange between devices over a very short range (e.g., 20 centimeters or less). RF interface 308 can be implemented using a combination of hardware (e.g., driver circuits, antennas, modulators/demodulators, encoders/decoders, and other analog and/or digital signal processing circuits) and software components. Multiple different wireless communication protocols and associated hardware can be incorporated into RF interface 308.

Environmental sensors 314 can include various electronic, mechanical, electromechanical, optical, or other devices that provide information related to external conditions around mobile device 300. Sensors 314 in some embodiments can provide digital signals to processing subsystem 302, e.g., on a streaming basis or in response to polling by processing subsystem 302 as desired. Any type and combination of environmental sensors can be used; shown by way of example are accelerometer 342, a magnetometer 344, a gyroscope 346, and a GPS receiver 348. These sensors can operate similarly to corresponding sensors in wearable device 200 described above. Other sensors can also be included in addition to or instead of these examples, such as temperature sensors, proximity sensors, ambient light sensors, ambient sound (or noise) sensors, or the like.

Power subsystem 312 can provide power and power management capabilities for mobile device 300. For example, power subsystem 312 can include a battery 340 (e.g., a rechargeable battery) and associated circuitry to distribute power from battery 340 to other components of mobile device 300 that require electrical power. In some embodiments, power subsystem 312 can also include circuitry operable to charge battery 340, e.g., when an electrical connector (not shown) is connected to a power source. In some embodiments, power subsystem 312 can include a "wireless" charger, such as an inductive charger, to charge battery 340 without relying on a physical connector. In some embodiments, power subsystem 312 can also include other power sources, such as a solar cell, in addition to or instead of battery 340.

In some embodiments, power subsystem 312 can control power distribution to components within mobile device 300 to manage power consumption efficiently. For example, when mobile device 300 is in an inactive state (not interacting with a user), power subsystem 312 can place device 300 into a low-power state, e.g., by powering off various components of user interface 306, RF interface 308, and/or environmental sensors 314. Power subsystem 312 can also provide other power management capabilities, such as regulating power consumption of other components of mobile device 300 based on the source and amount of available power, monitoring stored power in battery 340, generating user alerts if the stored power drops below a minimum level, and so on.

In some embodiments, control functions of power subsystem 312 can be implemented using programmable or controllable circuits operating in response to control signals generated by processing subsystem 302 in response to program code executing thereon, or as a separate microprocessor or microcontroller.

It will be appreciated that mobile device 300 is illustrative and that variations and modifications are possible. In various embodiments, other controls or components can be provided in addition to or instead of those described above. Any device capable of interacting with a wearable device to detect stowing and/or unstowing events as described herein can be a mobile device.

Further, while the mobile device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 3 be implemented in a given embodiment of a mobile device.

Communication between a mobile device and a wearable device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

In accordance with certain embodiments of the present invention, wearable device 100 and mobile device 102 can communicate with each other to determine when mobile device 102 becomes stowed and/or when mobile device 102 is removed from stowage. The determination can be based on various factors, depending on the sensors and combinations of sensors available on the devices.

Figure 4A:
FIGS. 4A and 4B show an example of a user removing a mobile device from stowage in a pocket.
Figure 4B:
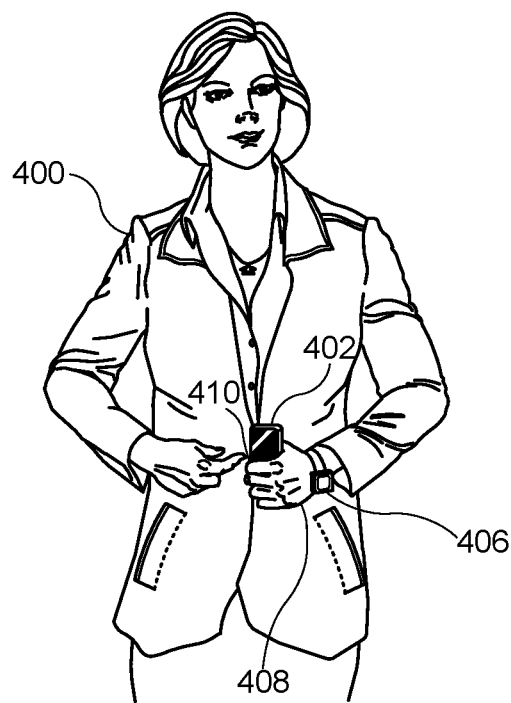

For example, FIGS. 4A and 4B show a user 400 removing a mobile device 402 (in this example a mobile phone) from stowage in a pocket. In FIG. 4A, user 400 is reaching into pocket 404, and in FIG. 4B, mobile device 402 has been removed from pocket 404 and positioned for use. User 400 is wearing a wearable device 406 on her wrist 408 while hand 410 holds the phone. In this example, mobile device 402 and wearable device 406 are in close proximity (within a few inches) and are experiencing highly similar accelerations as both devices move with the movement of the user's hand 410 and wrist 408, which are closely connected to each other.

Figure 5A:
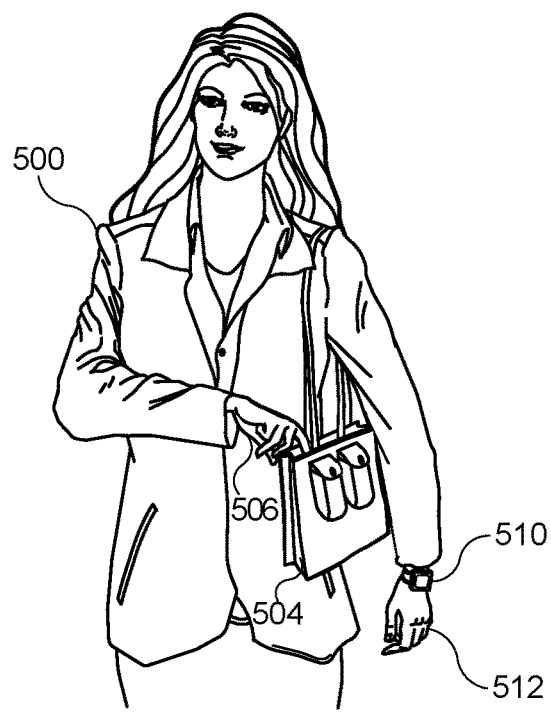
FIGS. 5A and 5B show an example of a user removing a mobile device from stowage in a bag.
Figure 5B:
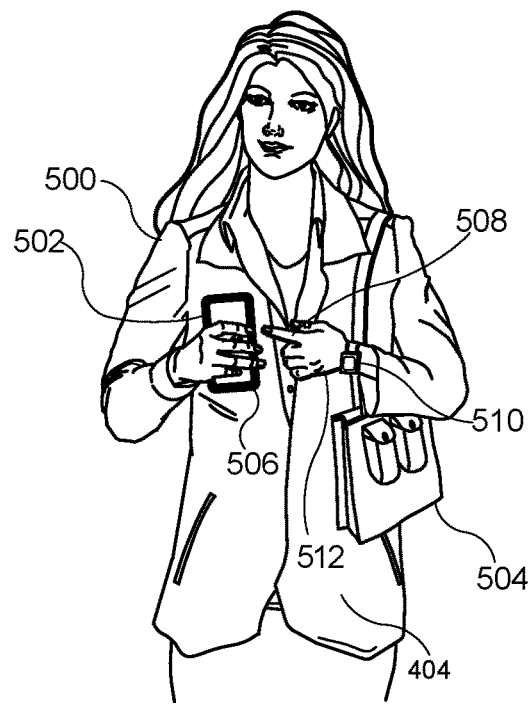

FIGS. 5A and 5B show another example of a user 500 preparing to use a mobile device 502 (in this example a mobile phone). In FIG. 5A, user 500 is removing mobile device 502 from stowage in a bag 504 using right hand 506, and in FIG. 5B, user 500 is preparing to operate mobile device 502 using left hand 508, with wearable device 510 on wrist 512. Despite being connected to different hands, mobile device 502 and wearable device 510 are brought into close proximity and may also experience similar accelerations.

Figure 6:
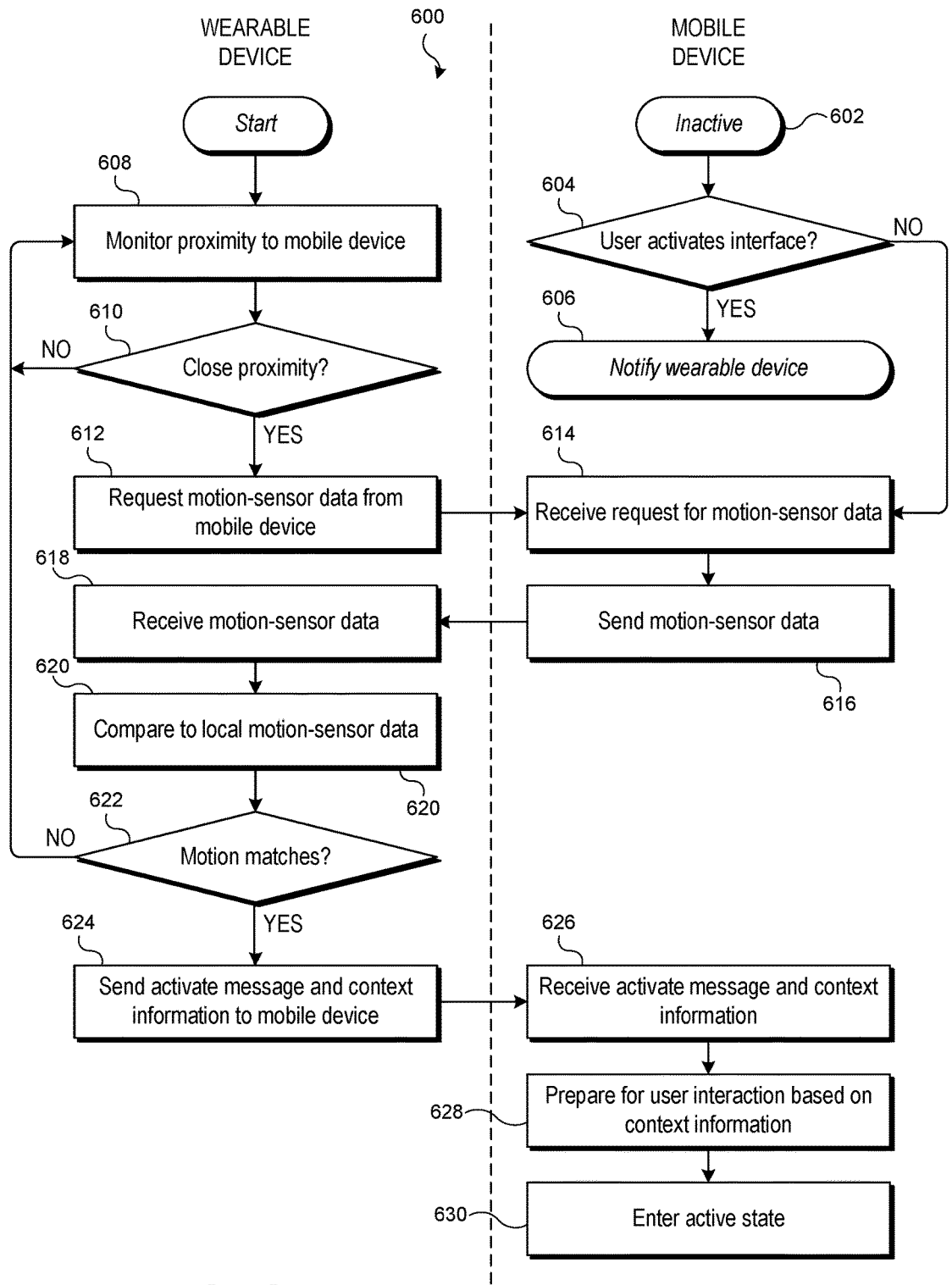
FIG. 6 is a flow diagram of a process for detecting that a mobile device is being unstowed (removed from stowage) according to an embodiment of the present invention.

In both of these examples, a combination of proximity of the devices and similarity of their motion can be used to determine that the user has unstowed the mobile device in preparation for interacting with it. FIG. 6 is a flow diagram of a process 600 for detecting that a mobile device is being unstowed (removed from stowage) according to an embodiment of the present invention. Portions of process 600 can be implemented in a wearable device, e.g., wearable device 100 of FIG. 1, while other portions can be implemented in a mobile device, e.g., mobile device 102 of FIG. 1. Process 600 uses proximity sensor data and accelerometer data to detect removal from stowage.

Process 600 can begin after a connection has been established between mobile device 102 and wearable device 100 such that the devices are capable of recognizing and communicating with each other. For example, the user may establish a Bluetooth pairing or other communication channel between the devices. In some embodiments, the pairing process can require a user confirmation on both devices that the pairing should be established, reducing the likelihood of unwanted pairings. The connection can be any connection that allows two-way communication between mobile device 102 and wearable device 100.

Further, it is assumed that when process 600 begins, mobile device 102 is in an inactive state, consistent with being stowed (e.g., in a sleep state or locked state). While in the inactive state (block 602) mobile device 102 can wait for signals from wearable device 100. Mobile device 102 can also detect (block 604) whether the user has manually activated mobile device 102, e.g., by touching a "wake up" or "home" button or other control. If, at block 604, the user activates mobile device 102, mobile device 102 can so notify wearable device 100, and process 600 can end.

In the absence of a notification from mobile device 102, at block 608, wearable device 100 can monitor its proximity to mobile device 102, e.g., using Bluetooth LE proximity sensors or other proximity sensors. At block 610, wearable device 100 can determine, based on the proximity sensor signals, whether mobile device 102 is sufficiently close to indicate a possible unstowing event. For example, the estimated distance based on the Bluetooth LE sensors can be compared to a proximity threshold, with a distance less than the threshold defined as "close" proximity. The proximity threshold can be defined as desired. In some embodiments, the threshold can be based on specific expectations about distances between devices; for instance, in the configurations shown in FIGS. 4 and 5, a threshold distance can be six inches, eight inches, or the like. In some embodiments, criteria for close proximity at block 610 can include further conditions to help filter out incidental proximity, such as when the user's wrist wearing wearable device 100 might be swinging near a pocket or bag where mobile device 102 is stowed. For instance, criteria for close proximity can require that the distance be roughly constant for some minimum period of time (e.g., 0.5 or 1.0 seconds). Wearable device 100 can continue monitoring the proximity until such time as the criteria for close proximity are satisfied.

In response to detecting close proximity, wearable device 100 can obtain motion-sensor data (e.g., accelerometer data) from mobile device 102. For example, at block 612, wearable device 100 can request motion-sensor data from mobile device 102. Mobile device 102 can receive the request at block 614 and respond by sending motion-sensor data at block 616. At block 618, wearable device 100 can receive the accelerometer data. In some embodiments, the motion-sensor data can be streamed in a manner that allows wearable device 100 to analyze the motion across time.

At block 620, wearable device 100 can compare motion-sensor data from mobile device 102 with its own ("local") motion-sensor data. The comparison can be based on a statistical correlation metric and/or a combination of correlation metrics. At block 622, wearable device 100 can determine whether the motion-sensor data indicates matching motions; in this context, a "match" is found if the comparison satisfies some set of criteria, e.g., threshold values on one or more correlation metrics. Thus, a match need not be an exact match.

For example, in some embodiments, an accelerometer in wearable device 100 and an accelerometer in mobile device 102 can each provide vector acceleration data along three orthogonal axes (x, y, z). However, the (x, y, z) axes of each device may be defined relative to that device's housing (e.g., the z axis may be defined as a normal to the display screen pointing outward, with x and y axes parallel to edges of the display screen), and the orientation of the devices relative to each other can be different depending on how the user is holding or wearing the devices. Thus, simply comparing acceleration vector components may not be reliable. In some embodiments, the magnitude of the acceleration vectors of the two devices can be compared, disregarding direction. In other embodiments, another sensor (e.g., a gyroscope) can be used to define an "up" direction (e.g., relative to the local gravitational field), and up direction can be used to project the acceleration vectors onto a common two-dimensional or three-dimensional coordinate system prior to comparing magnitude and/or specific vector components.

If a match is not detected, wearable device 100 can continue monitoring at block 608. If the devices remain in close proximity, additional accelerometer data can be obtained and compared, and this process can continue indefinitely until a match is detected.

If, at block 622, a match in accelerometer data is detected, then at block 624, wearable device 100 can send an activate message to mobile device 102. The activate message can be any message that mobile device 102 is capable of recognizing as an instruction to enter an "active" state, in which a user can interact with mobile device 102. In some embodiments, the activate message can include context information from wearable device 100; this context information can include any information about current and/or recent user-interface activity at wearable device 100. For instance, if wearable device 100 recently (e.g., within the last 1 minute, 2 minutes, 5 minutes or other defined time interval) presented an alert to the user, the context information can include information about the alert. If the user recently operated an input control of wearable device 100 (e.g., selecting a menu option via touchscreen 105), the context information an include an indication as to what control was operated. In some embodiments, context information can be provided in a separate message from the activate message.

At block 626, mobile device 102 can receive the activate message and the context information. At block 628, mobile device 102 can prepare itself for user interaction. For example, mobile device 102 can activate user interface components (e.g., turn on a display or speaker, activate a touch sensor or other input control). In addition, mobile device 102 can prepare for specific user interactions based on the context information. For instance, if the context information indicates that the user is likely to be interested in a particular app (e.g., an email app), mobile device 102 can automatically launch that app (or bring it to the foreground if it is executing as a background process). Further, if the context information indicates that the user is likely to be interested in particular information within an app (e.g., a specific email message), mobile device 102 can automatically configure the state of the app such that the particular information is presented.

At block 630, mobile device 102 can enter the active state, allowing user interaction. In some embodiments, entering the active state can include unlocking the device such that the user need not enter a passcode or present another security credential to mobile device 102 prior to interacting with it. In such embodiments, the close proximity of wearable device 100 can be treated as a sufficient security credential, and if desired, mobile device 102 can perform its own determination of the proximity of wearable device 100.

Figure 7:
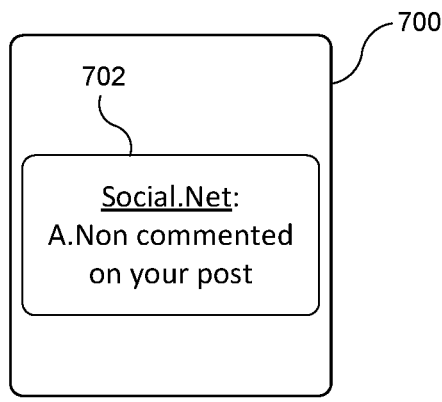

Upon entering the active state at block 630, mobile device 102 can present a user interface screen corresponding to an inferred user intent, based on the context information received at block 626. FIGS. 7-11 show examples of selecting a user interface screen according to various embodiments of the present invention. FIG. 7 shows a user interface screen 700 for a wearable device, e.g., wearable device 100. In this example, screen 700 is displaying an alert 702 indicating that a member of the user's social network has commented on the user's post to the social network. If the user removes mobile device 102 from stowage while alert 702 is displayed (or, in some embodiments, for a period of time after mobile device 102 ceases to display alert 702), wearable device 100 can provide information about alert 702 as context information to mobile device 102. This context information can include, e.g., an indicator that the social network (social.net) generated the alert and/or a representation or reference to the alert's specific content (e.g., that the alert references a comment from A.Non).

Figure 8:
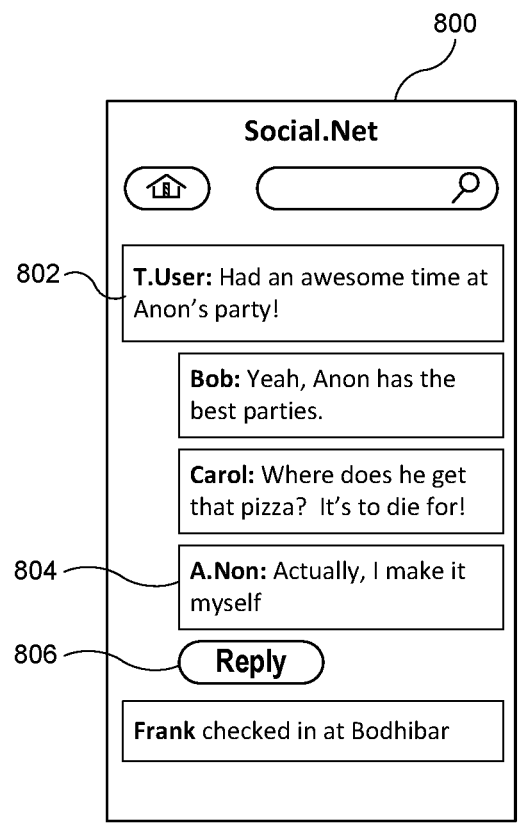

In response to receiving context information regarding alert 702, mobile device 102 can prepare itself for user interaction, e.g., by presenting interface screen 800 of FIG. 8. Screen 800 can be an interface screen for the user's social networking app (for the social network on which the comment was made). In the example shown, screen 800 can include the user's post 802 that was commented on and the comment 804 for which the alert on wearable device 100 was generated. Screen 800 can also include a reply control 806, so that the user can readily read comment 804 and reply if so inclined. In this example, several navigation steps that might otherwise be required can be skipped. For example, the user does not need to unlock mobile device 102 (assuming mobile device 102 automatically unlocks in response to the activate message from wearable device 100). The user also does not need to launch the social networking app or navigate within the app to find comment 804.

As another example, FIG. 9 shows another user interface screen 900 for a wearable device, e.g., wearable device 100. In this example, screen 900 is displaying an alert 902 indicating that the user has received an email from someone. Screen 900 can also offer options to the user, such as a reply button 904 that is operable to initiate replying to the email. In this example, the user can unstow mobile device 102 either before or after selecting reply button 904 (or not at all; the user is not required to respond to any alerts, or the user may choose to respond only via wearable device 102).

If the user unstows mobile device 102 prior to selecting reply button 904, wearable device 100 can provide information about alert 902 as context information to mobile device 102. For example, the context information can indicate that an incoming-email alert is displayed, an identifier of the sender, an identifier of the specific email message, etc.

In response to receiving context information regarding alert 902, mobile device 102 can prepare itself for user interaction, e.g., by presenting interface screen 1000 of FIG. 10. Screen 1000 can be an interface screen for the user's email app. In the example shown, screen 1000 can present the email 1002 for which the alert on wearable device 100 was generated.

If, instead, the user selects reply button 904 prior to unstowing mobile device 102, the context information provided by wearable device 100 can include not only information about the email but also information indicating that the user has indicated an intent to reply. In response to this context information, mobile device 102 can prepare itself for a different user interaction, e.g., by presenting interface screen 1100 of FIG. 11. Screen 1100 can be another interface screen for the same email app as screen 1000 of FIG. 10. However, screen 1100 can be a "compose" interface via which the user can compose a reply. For instance, the draft reply can be shown at 1102 with the received email below at 1104, a cursor 1106 to indicate where new text will appear, and a virtual keyboard 1108 operable to enter text into the draft reply.

As with the social-networking example, several navigation steps that might otherwise be required can be skipped as a result of providing context information that allows mobile device 102 to infer the user's likely intent. For example, the user does not need to unlock mobile device 102, launch the email app, locate the message of interest, or (in the case of FIG. 11) select a reply function. All of these actions can be done automatically by mobile device 102 using context information provided by wearable device 100.

In various embodiments, mobile device 102 can use any context information available from wearable device 100 to infer a likely user intent and prepare a user interface relevant to that intent. For example, a user may receive news alerts about selected topics (e.g., stock prices, sports scores for a particular team) on wearable device 100, and information regarding these alerts can be included in context information provided to mobile device 102. In response, mobile device 102 can present related information (e.g., a stock-trading app, a report about the game) upon being unstowed. As another example, wearable device 100 may alert the user to an upcoming calendar event, such as a phone call or meeting, and mobile device 102 can present an interface related to the event (e.g., a phone interface if the event is a phone call, an agenda or driving directions to a meeting location if the event is a meeting). As still another example, if the context information received by mobile device 102 indicates that wearable device 100 is alerting the user to an incoming call, mobile device 102 can infer that the user intends to answer the call and can either automatically answer or present an interface screen with options related to answering, holding, and/or declining a call.

In some instances, the inferred user intent may not match the user's actual intent. For instance, the user may have picked up mobile device 102 for reasons unrelated to the most recent (or any) alert on wearable device 100. Where this is the case, the user can navigate to the desired interface. In some embodiments, mobile device 102 can implement a scoring system to determine whether inferences as to intent were or were not accurate (e.g., whether the user interacted with the screen initially presented or navigated to a different screen) and can apply heuristic learning algorithms to improve the inferences over time.

As described above, in process 600, removal of mobile device 102 from stowage can be detected based on a combination of proximity and motion sensor data. In some instances, errors can occur; a false positive occurs where an unstowing event is detected when mobile device 102 was not actually unstowed, and a false negative occurs where the user unstowed mobile device 102 but no unstowing event was detected. As an example of a false positive, a user may remove mobile device 102 from a pocket or bag and put it on a table, or the user may pick up the device just to move it from one location to another within a room or between rooms. Such events, however, may satisfy the proximity and motion criteria and result in mobile device 102 entering active state. In this case, mobile device 102 can automatically return to inactive state on its own (e.g., using its internal power-management processes), or a stowing event may be detected (e.g., using processes described below.) As an example of a false negative, a user may unstow mobile device 102 and begin to use it, but the manner of motion (e.g., not bringing mobile device 102 into close proximity to wearable device 100) may result in no unstowing event being detected by process 600. In this case, the user can manually activate mobile device 102.

Some embodiments can implement additional criteria to reduce errors in detecting unstowing events. For instance, if the user picks up mobile device 102 when wearable device 100 has just generated an alert or right after an interaction with wearable device 100, it can be inferred that the user's action is likely responsive to the alert or other interaction with wearable device 100 and that the user intends to continue or extend the interaction using mobile device 102. In contrast, if wearable device 100 is and has been idle for a while, the user's intent in picking up mobile device 102 may be less clear. Accordingly, adding criteria based on the state of wearable device 100 to process 600 of FIG. 6 can reduce errors.

Figure 12:
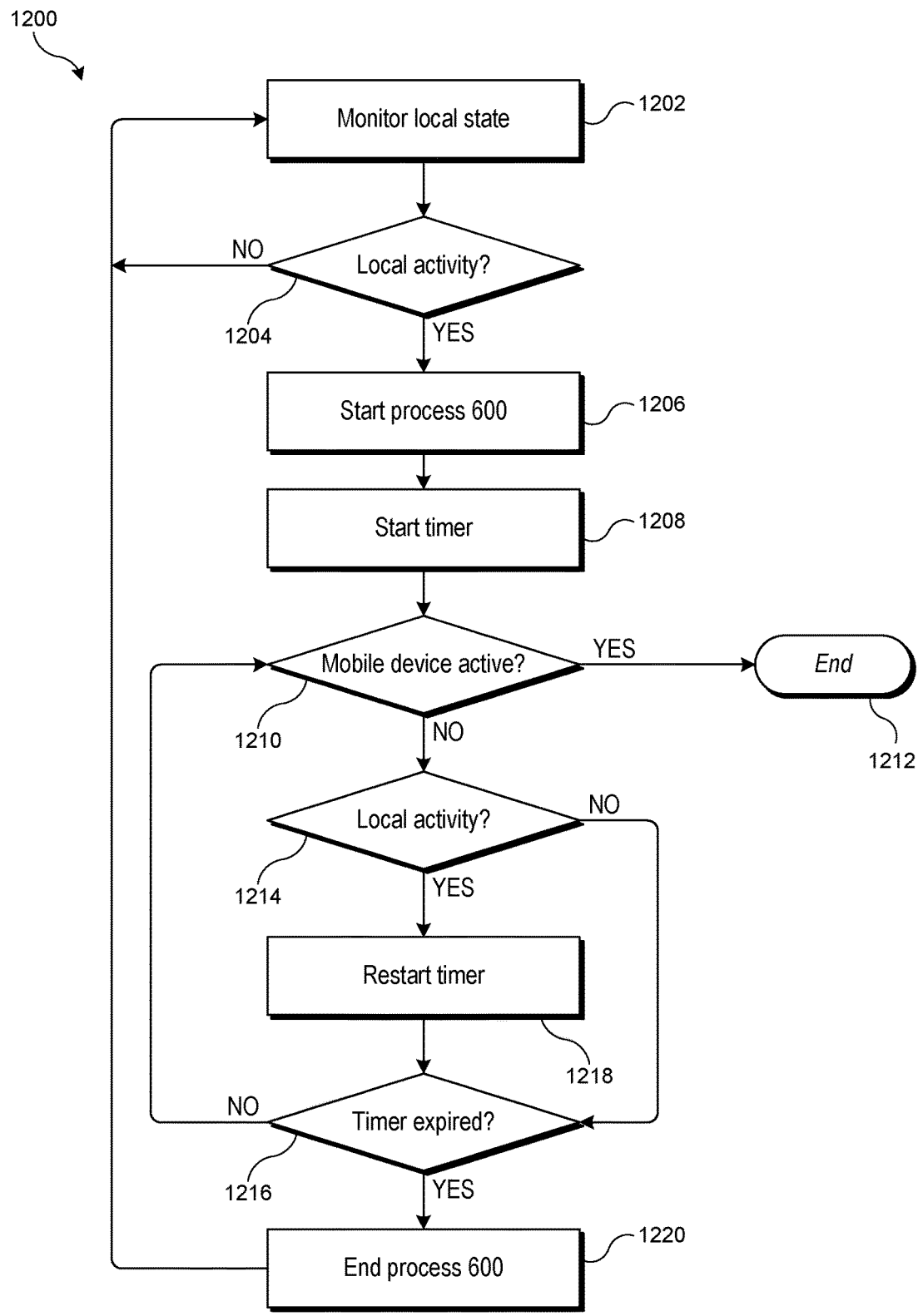
FIG. 12 is a flow diagram of a process for determining when to initiate detection of unstowing of a mobile device according to an embodiment of the present invention.

FIG. 12 is a flow diagram of a process 1200 for determining when to initiate process 600 according to an embodiment of the present invention. Process 1200 can be implemented, e.g., in wearable device 100 of FIG. 1. Process 1200 can begin at any time when wearable device 100 is paired and communicating with mobile device 102 and mobile device 102 is in a state consistent with being stowed. Portions of process 1200 can be executed concurrently with process 600 described above or other processes for detecting an unstowing event.

At block 1202, wearable device 100 can monitor its own state to determine (block 1204) whether it is active or idle. For example, wearable device 100 can be considered active when it is displaying an alert (e.g., for a prescribed time interval such as 1 minute, 2 minutes, 10 minutes or other interval; the interval can depend on the particular alert) and/or when the user is currently operating or has recently (e.g., within the last 1 minute, 2 minutes, or some other interval) operated the user interface of wearable device 100. Time intervals for defining when wearable device 100 is active in this context can be selected as desired, e.g., depending on whether false positives or false negatives are more tolerable. (A shorter interval can reduce false positives but may increase false negatives.)

If wearable device 100 is active, process 600 (or another process for determining whether a mobile device is being removed from stowage) can be initiated at block 1206. At block 1208, wearable device 100 can start a timer to determine how long process 600 should be allowed to run. This timer can be initialized, e.g., to 1 minute, 2 minutes, 5 minutes, or the like. (As at block 1202, a shorter interval can reduce false positives but may increase false negatives.)

While process 600 is executing, process 1200 can monitor mobile device 102, e.g., via polling or push notification, to determine (block 1210) whether mobile device 102 has entered active state. In this example, mobile device 102 can enter active state via block 630 of process 600 (or other automated process) or as a result of user action (e.g., manually activating mobile device 102 by pressing a button, as at block 604 of process 600). Once mobile device 102 becomes active, process 1200 can end (block 1212). In some embodiments, mobile device 102 can notify wearable device 100 when it transitions from active state back to inactive state, and process 1200 can be restarted in response to this notification.

If, at block 1210, mobile device 102 is not in active state, then at block 1214, process 1200 can determine whether further user-interface activity (e.g., user operating controls or new alerts being displayed) has occurred at wearable device 100. If not, then at block 1216, process 1200 can determine whether the timer started at block 1208 has expired. If the timer has not expired, process 1200 can return to block 1210 to determine if mobile device 102 has entered active state. At block 1214, further user-interface activity at wearable device 100 can result in resetting the timer at block 1218 and continuing to monitor the state of mobile device 102 at block 1210. In some embodiments, when starting or resetting the timer, the timeout period can depend on the most recent activity at wearable device 100; for instance, activity related to an incoming call alert may have a shorter timeout period than activity related to an email message.

If, at block 1216, the timer expires without mobile device 102 entering active state, wearable device 100 can terminate process 600 at block 1220. Process 1200 can return to block 1202.

Process 1200 is based in part on detecting time correlations between activity at the wearable device and a user removing the mobile device from stowage. Other processes can be used to detect such time correlations. In some embodiments, process 600 (or similar process) can be executed regardless of whether recent user-interface activity has occurred at wearable device 100, but different criteria for detecting unstowing can be employed. For instance, the criteria for matching motion at block 622 can be relaxed or tightened, depending on how recently user-interface activity occurred at wearable device 100.

In addition to or instead of detecting when a mobile device is removed from stowage, some embodiments can detect when a mobile device that has been in active use becomes stowed. For example, similarly to the manner in which a combination of close proximity and correlations in the motion-sensor data between the mobile device and a wearable device can be used as indicators that the mobile device has been removed from stowage, the discontinuation of close proximity and/or correlations in the motion-sensor data can be used to indicate that the mobile device has been stowed.

Figure 13:
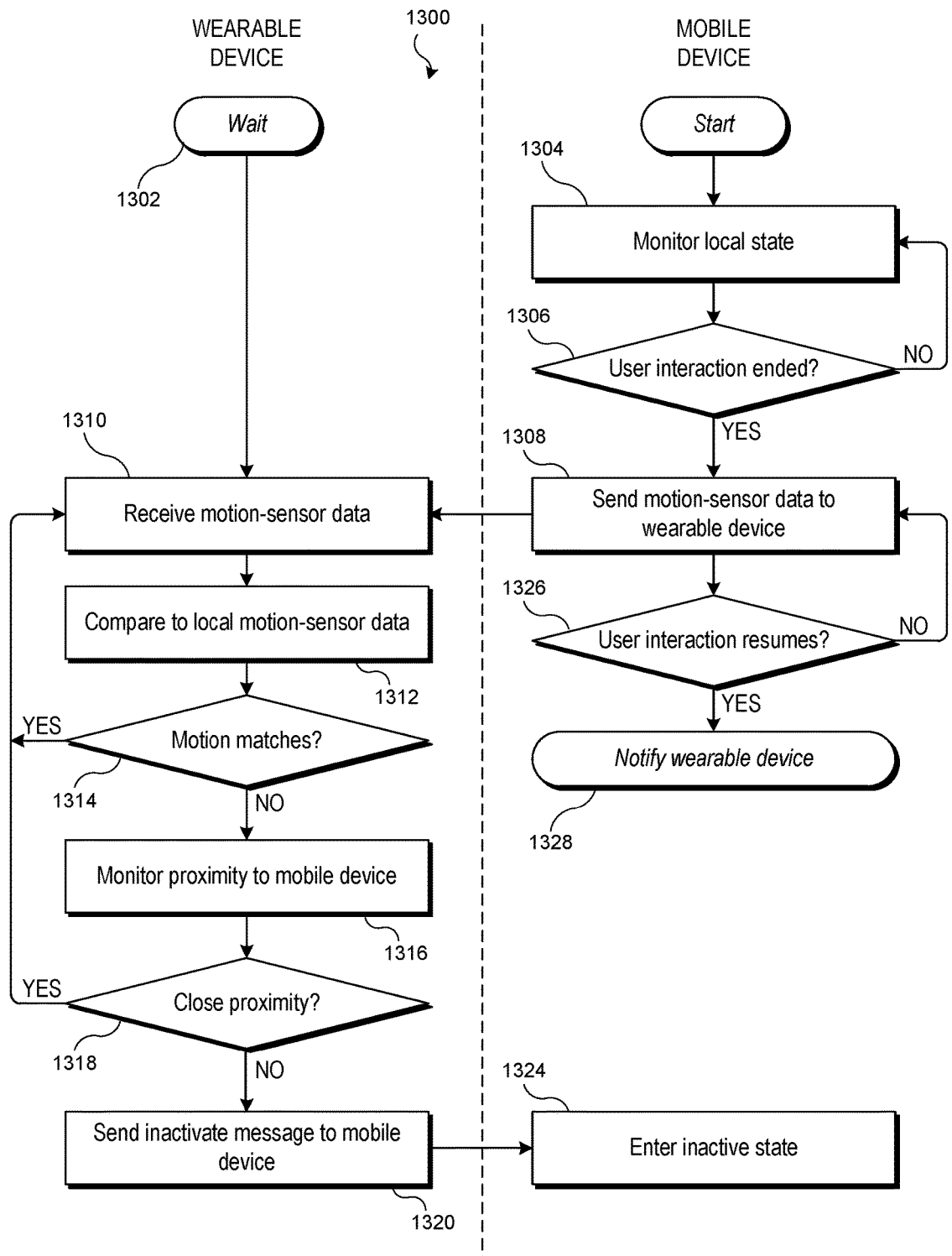
FIG. 13 is a flow diagram of a process for detecting stowing of a mobile device according to an embodiment of the present invention.

FIG. 13 is a flow diagram of a process 1300 for detecting stowing of a mobile device according to an embodiment of the present invention. Portions of process 1300 can be implemented, e.g., in wearable device 100 of FIG. 1, while other portions can be implemented, e.g., in mobile device 102 of FIG. 1. Process 1300 uses proximity sensor data and accelerometer data to detect stowing of a mobile device.

Process 1300 can begin while wearable device 100 and mobile device 102 are paired and while mobile device 102 is in active state, e.g., after execution of process 600. Wearable device 100 can wait at block 1302 while mobile device 102 monitors its own state at block 1304 to determine (block 1306) whether the user has stopped interacting with mobile device 102. For example, the user is determined to have stopped interacting if no user input is received for a specified time interval (e.g., 30 seconds, 1 minute or the like). This interval can be shorter than other intervals associated with automatic inactivation or powering down of mobile device 102. Once the user has stopped interacting, at block 1308, mobile device 102 can begin sending its motion-sensor data (e.g., accelerometer data) to wearable device 100.

At block 1310, wearable device 100 can receive the motion-sensor data from mobile device 102, and at block 1312, wearable device 100 can compare this data to its own motion-sensor data. Similarly to process 600, the comparison can be based on a statistical correlation metric and/or a combination of correlation metrics. At block 1314, wearable device 100 can determine whether the accelerometer data matches; in this context, a "match" is found if the comparison satisfies some set of criteria, e.g., threshold values on one or more correlation metrics. Thus, a match need not be an exact match. If a match is found, wearable device 100 can continue to monitor the motion-sensor data.

At block 1316, if the accelerometer data has ceased to match, wearable device 100 can determine its proximity to mobile device 102; this can be similar to block 608 of FIG. 6. At block 1318, if the devices remain in close proximity (which can be based on similar criteria to block 610 of FIG. 6), wearable device 100 can return to block 1310 (or another earlier block) until such time as close proximity is no longer found at block 1318. Once this condition occurs, at block 1320, wearable device 100 can send an instruction to mobile device 102 to enter an inactive state. At block 1324, mobile device 102 can enter the inactive state. In various embodiments, entering the inactive state can include turning off a display, disabling a user input component, and/or locking the device to deter unauthorized use; other operations may also be incorporated, e.g., to reduce power consumption and/or provide security.

In some embodiments, resumption of user interaction with mobile device 102 can terminate process 1300. For example, after starting to send motion-sensor data at block 1308, mobile device 102 can continue to monitor its local state to determine (block 1326) if user activity resumes. If so, then at block 1328, mobile device 102 can notify wearable device 100, and process 1300 can terminate or restart. In addition, if the user manually places mobile device 102 into an inactive state (e.g., by pressing a sleep button), mobile device 102 can so notify wearable device 100, and process 1300 can terminate.

Process 1300 provides that mobile device 102 can remain awake and unlocked for as long as wearable device 100 remains in close proximity, regardless of accelerometer variations. This implementation can prevent inadvertent locking due to relative motion between mobile device 102 and wearable device 100 (e.g., if mobile device 102 is held in one hand while wearable device 100 is worn on the opposite wrist). Other implementations can use other criteria, including various combinations of accelerometer data correlations and proximity.

It will be appreciated that processes 600 and 1300 are illustrative and that variations and modifications are possible. Order of steps may be varied, and steps may be added, modified, combined or omitted, and either or both processes or variations thereof can be implemented in various embodiments. Where both processes are implemented, the criteria used in process 1300 (or other processes) for determining when the mobile device is stowed and should enter inactive state can be but need not be the converse of the criteria used in process 600 (or other processes) for determining when the mobile device is removed from stowage and should enter active state.

In some embodiments, other information can be used to facilitate determining when the mobile is being stowed or removed from stowage. For example, users typically move their mobile devices relatively quickly when lifting them off a surface or pulling them out of a pocket or bag. Such actions can be detectable by the mobile device using its own motion-sensor data. In one such scenario, if a mobile device is in a bag being carried by a user walking along at a steady pace, the mobile device can detect a baseline pattern of accelerations based on the user's walking; if the user reaches into a pocket or bag and pulls out the mobile device, the device will detect a change from the baseline. Changes from a baseline motion pattern can also be detected if the user lifts the mobile device from a surface on which it is resting, pulls it out of a pocket, or otherwise changes the location and/or orientation of the mobile device to make its interface accessible.

Detection of such a change can be incorporated into processes for detecting removal from and/or return to stowage. For instance, rather than initiating the comparison of accelerometer data based on proximity (e.g., as shown in FIG. 6), the comparison can be initiated based on mobile device 102 detecting a change in its acceleration pattern or other motion pattern. Similarly, after the mobile device has been in active use, a cessation of user input followed by brief acceleration followed by a return to baseline motion may be indicative of being stowed, and such an event may trigger checking of proximity and/or relative motion between the mobile device and a wearable device to verify whether the mobile device has been stowed.

Further, in some embodiments, mobile device 102 can have other sensors that can provide additional data about its environment. For instance, various mobile devices can have ambient light sensors, ambient noise sensors, sensors that detect proximity of an object (e.g., detecting when the display is close to an opaque object such as the side of the user's face during a phone call), and so on. Such sensors can provide indications of possible stowing or unstowing of the mobile device and can be incorporated into processes for detecting stowing and unstowing events.

Figure 14:
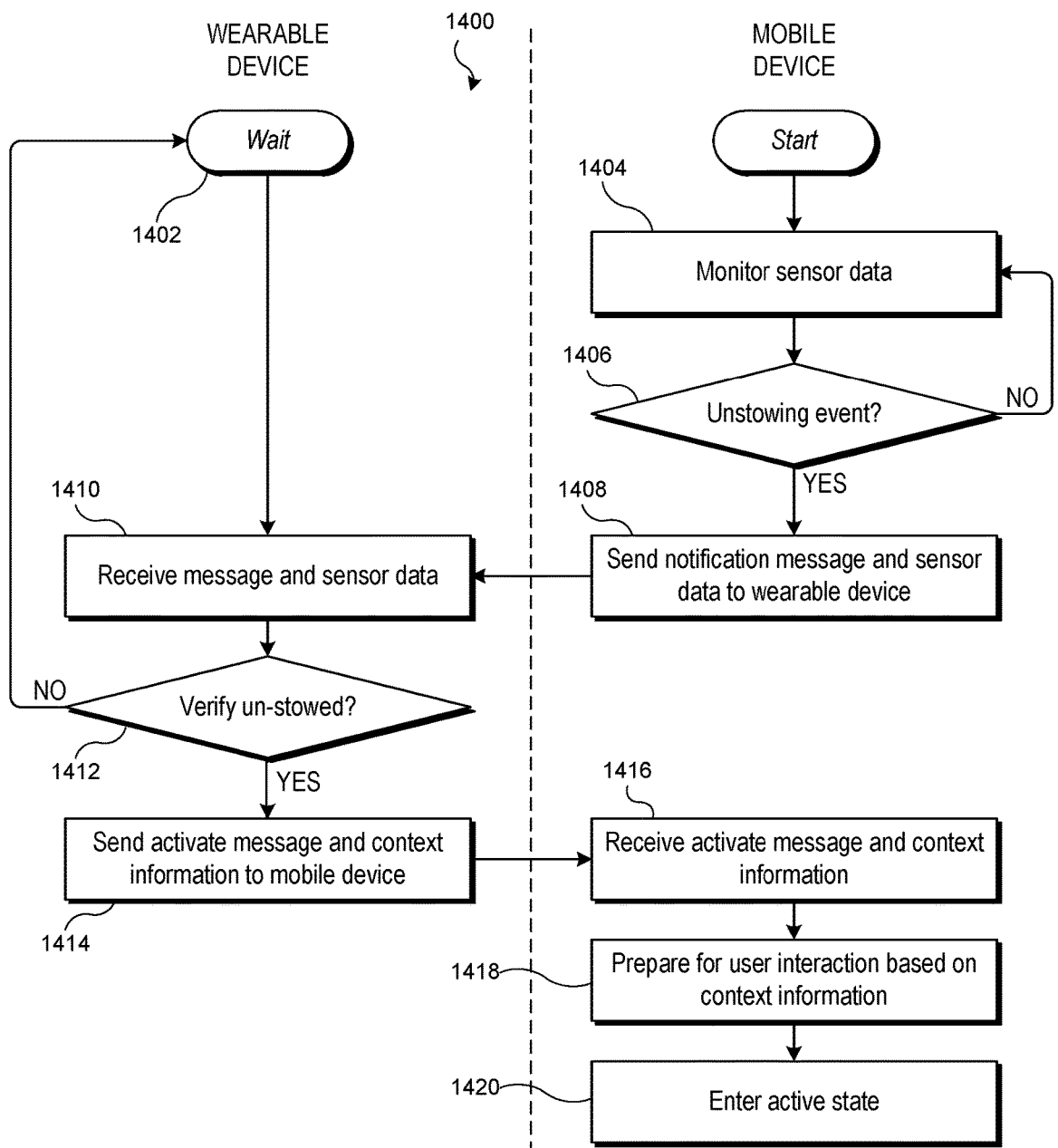
FIG. 14 is a flow diagram of a process for detecting removal of a mobile device from stowage according to an embodiment of the present invention

FIG. 14 is a flow diagram of a process 1400 for detecting removal of a mobile device from stowage according to an embodiment of the present invention. Portions of process 1400 can be implemented, e.g., in wearable device 100 of FIG. 1, while other portions can be implemented, e.g., in mobile device 102 of FIG. 1. Process 1400 uses sensor data from the mobile device as a trigger to detect a possible removal from stowage and uses data from the wearable device to verify the removal.

Process 1400 can begin when mobile device 102 and wearable device 100 are in communication and mobile device 102 is in an inactive state. Wearable device 100 can wait at block 1402 while mobile device 102 monitors its sensor data at block 1404. Mobile device 102 can monitor any sensor data available to it, including accelerometer data as well as data from other environmental sensors such as those described above. At block 1406 mobile device 102 can determine whether a possible unstowing event has occurred. A possible unstowing event can be detected based on data from any sensor or combination of sensors of mobile device 102 that indicates a likely change in condition from stowed to unstowed. For example, as described above, an abrupt change in accelerometer or other motion-sensor data can be an indicator. Changes in data from an ambient light sensor can be another indicator. For instance, the ambient light level may increase if the mobile device was stowed in an opaque bag or pocket or face down on a desk. An increase in ambient noise may indicate removal from stowage if the device was stowed in a manner that wholly or partially blocks sound (e.g., deep inside a bag). In some embodiments, data from multiple sensors can be combined using various heuristics for determining likelihood that a particular combination of changes indicates removal from stowage.

Once a possible unstowing event is detected at block 1406, then at block 1408, mobile device 102 can send a notification to wearable device 100. The notification can include sensor data, and in some embodiments, mobile device 102 may begin to stream some or all of its sensor data to wearable device 100.

At block 1410, wearable device 100 can receive the sensor data from mobile device 102, and at block 1412, wearable device 100 can determine whether to verify the possible unstowing event detected by mobile device 102 at block 1406.

Verification at block 1412 can include a variety of criteria. For example, as described above with reference to FIG. 12, in some embodiments, automatic detection of unstowing may be limited to instances where wearable device 100 is in an active state. In some embodiments, wearable device 100 can determine its proximity to mobile device 102 (e.g., using Bluetooth LE or other proximity sensors) and/or its motion relative to mobile device 102 (e.g., using correlations of accelerometer data or other motion-sensor data), and the decision whether to verify the event can be based entirely or in part on these criteria (e.g., as described above with reference to FIG. 6). In some embodiments, wearable device 100 may have other sensors, such as an ambient light sensor, ambient noise sensor, or the like, and wearable device 100 can compare data from any of its sensors to data from corresponding sensors of mobile device 102; close correlation or matching may increase the likelihood that mobile device 102 has been unstowed. In some embodiments, heuristic algorithms can be used to evaluate correlation metrics based on inputs from multiple types of sensors and compute a likelihood score indicating the relative likelihood that an unstowing event has occurred, and wearable device 100 can verify the event if the likelihood score exceeds a threshold.

If the unstowing event is not verified at block 1412, then wearable device 100 can return to block 1402 to wait for another possible unstowing event. In some embodiments, wearable device 100 can send a message to mobile device 102 indicating that the unstowing event was not verified.

If the unstowing event is verified at block 1412, then at block 1414, wearable device 100 can send an activate message and/or context information to mobile device 102. At block 1416, mobile device 102 can receive the activate message and the context information. At block 1418, mobile device 102 can prepare itself for user interaction. These blocks can be similar or identical to blocks 626-630 of process 600 described above. As in the case of process 600, the provision of context information from wearable device 100 to mobile device 102 can reduce the burden on the user of navigating to specific information or functionality of interest.

Figure 15:
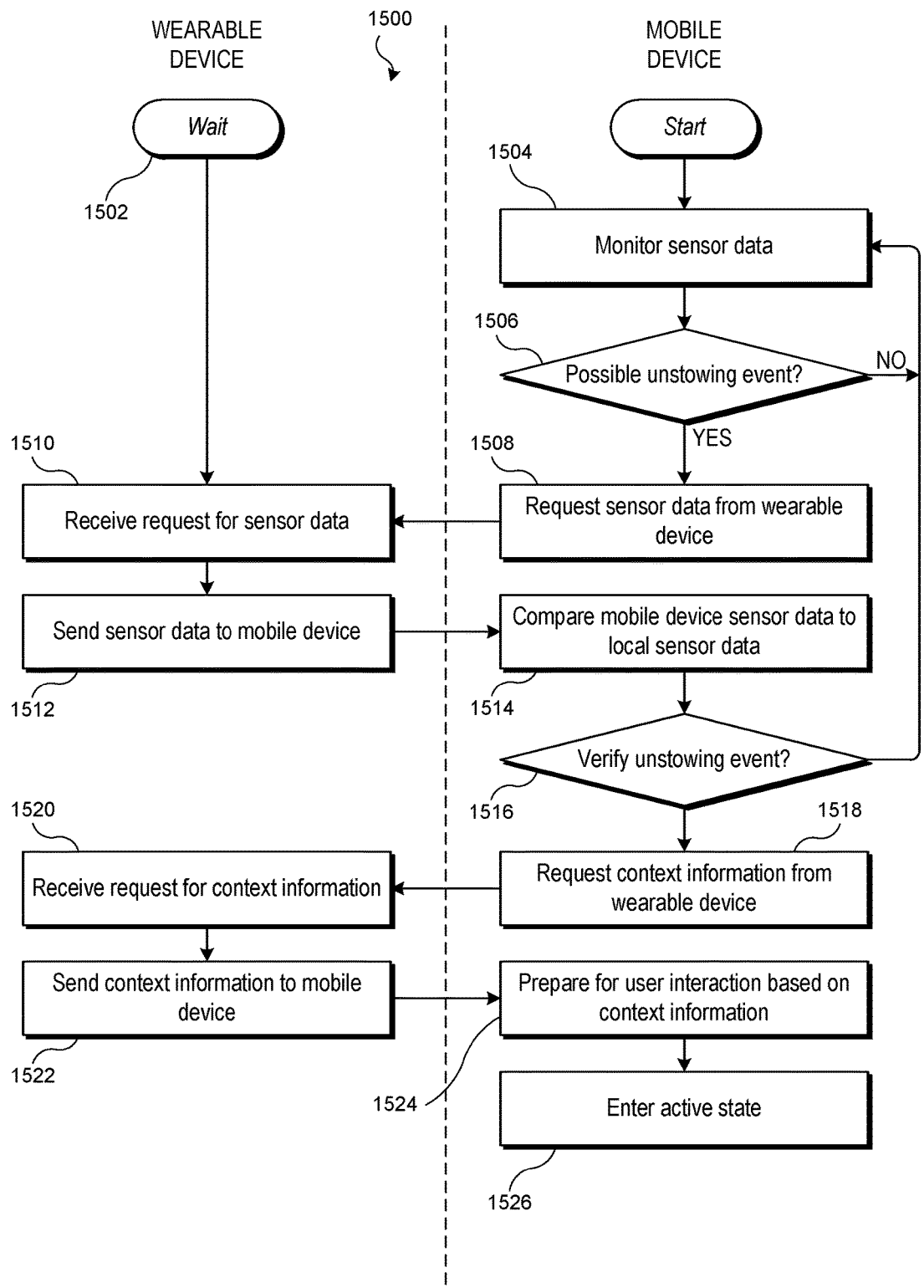
FIG. 15 is a flow diagram of another process for detecting removal of a mobile device from stowage according to an embodiment of the present invention.

In embodiments described above, the mobile device transmits sensor data to the wearable device, and the wearable device determines (or in some instances verifies) whether a stowing or unstowing event has occurred. In other embodiments, a different division of labor can be used. For instance, the wearable device can transmit sensor data to the mobile device, and the mobile device can use that data together with its own sensor data to determine (or verify) whether a stowing or unstowing event has occurred. FIG. 15 is a flow diagram of a process 1500 for detecting removal of a mobile device from stowage according to an embodiment of the present invention. Portions of process 1500 can be implemented, e.g., in wearable device 100 of FIG. 1, while other portions can be implemented, e.g., in mobile device 102 of FIG. 1. Like process 1400, process 1500 uses sensor data from the mobile device as a trigger to detect a possible removal from stowage and uses data from the wearable device to verify the removal. However, in process 1500, the verification is done at the mobile device.

Process 1500 can begin when mobile device 102 and wearable device 100 are in communication and mobile device 102 is in an inactive state. Wearable device 100 can wait at block 1502 while mobile device 102 monitors its sensor data at block 1504. Block 1504 can be similar or identical to block 1404 described above. At block 1506 mobile device 102 can determine whether a possible unstowing event has occurred; the determination can be similar or identical to block 1406 described above.

When a possible unstowing event is detected at block 1506, then at block 1508, mobile device 102 can request sensor data from wearable device 100. In various embodiments, mobile device 102 can request data for any or all environmental sensors present in wearable device 100. In some embodiments, the request is made only if mobile device 102 determines that wearable device 100 is in close proximity to mobile device 102; the criteria can be similar to proximity determinations made in processes described above, and mobile device 102 can make the determination. At block 1510, wearable device 100 can receive the request, and at block 1512, wearable device 100 can send sensor data to mobile device 102. In some embodiments, wearable device 100 may begin to stream some or all of its sensor data to mobile device 102.

At block 1514, mobile device 102 can compare sensor data received from wearable device 100 to its own sensor data, and at block 1516, mobile device 102 can determine whether to verify the possible unstowing event detected at block 1506. Verification at block 1516 can be similar to verification at block 1412 of process 1400, except that the verification at block 1516 is performed by mobile device 102. In some embodiments, verification at block 1516 can include determining that wearable device 100 is in close proximity to mobile device 102; this can be similar to other proximity determinations described above.

If the unstowing event is not verified at block 1516, then mobile device 102 can return to block 1502 to wait for another possible unstowing event. In some embodiments, mobile device 102 can send a message to wearable device 100 indicating that the unstowing event was not verified. (Wearable device 100 can stop streaming sensor data in response to such a message.)

If the unstowing event is verified at block 1516, then at block 1518, mobile device 102 can request context information from wearable device 100. At block 1520, wearable device 100 can receive the request (which may result in wearable device 100 ceasing to stream sensor data), and at block 1522, wearable device 100 can provide context information to mobile device 102. The context information can be similar to context information described above. At block 1524, mobile device 102 can prepare itself for user interaction, and at block 1526, mobile device 102 can enter the active state. These blocks can be similar or identical to blocks 626-630 of process 600 described above. As in the case of process 600, the provision of context information from wearable device 100 to mobile device 102 can reduce the burden on the user of navigating to specific information or functionality of interest.

Embodiments of the present invention can facilitate user interaction with a mobile device by providing a wearable device that can communicate with the mobile device. Using sensor data on both devices, the devices can determine when a user has unstowed the mobile device and/or when the user has re-stowed the mobile device after use. Further, the devices can communicate context information, allowing a more seamless transition from using one device to using the other. For example, as described above, upon being unstowed, the mobile device can activate itself and present an interface that continues an interaction begun on the wearable device. This can be useful in a number of situations. As one example, a wearable device such as a wrist-worn device may have a limited display area, which can restrict the amount of information and/or number of control options that can be presented to a user at a given time. A mobile device such as a mobile phone or tablet may have a larger display area that supports a richer user interface. The user can begin an interaction with the wearable device, e.g., finding out that a message has been received or that an event is scheduled or has occurred. The wearable device may be readily accessible (e.g., on the user's wrist) and therefore well suited for beginning an interaction. If the user wants to dig deeper, e.g., by responding to the message or obtaining more information about the event, the user can switch to the richer interface of the mobile phone or tablet. To the extent that the mobile device receives context information identifying the interaction that began on the wearable device, the mobile device can activate itself in a condition where it is ready to continue that interaction. This can enhance the user experience of the wearable device as an extension of the mobile device or vice versa.

While the invention has been described with respect to specific embodiments, one skilled in the art will recognize that numerous modifications are possible. For example, different sensors or combinations of sensors can be substituted for those described herein. A variety of different mobile devices and wearable devices can be used.

Embodiments described above assume that a pairing or other connection has been established that enables the mobile device and wearable device to recognize each other as being authorized for interoperation. This can reduce the likelihood that a mobile device will be automatically unlocked (or otherwise activated) as a result of communicating with a wearable device not authorized by the user. For additional security, the communication session established between the devices can be made secure. Examples of techniques for establishing a secure session are described in PCT International Application No. PCT/US2013/032508, filed Mar. 15, 2013; other techniques can also be used.

In some embodiments, the criteria used to detect stowing or unstowing of a mobile device can be varied, e.g., based on the current location of the devices. For example, a false positive that results in the mobile device unlocking may be less of a security concern if the user is at home than if the user is in a public place. Accordingly, the criteria for detecting unstowing of the mobile device may be relaxed at home, which can reduce false negatives and facilitate the user's interaction with the mobile device.

The foregoing description may make reference to specific examples of a wearable device (e.g., a wrist-worn device) and/or a mobile device (e.g., a mobile phone or smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for detecting unstowing of a mobile device using a wearable device, the method comprising:
   obtaining, by the wearable device, sensor data from the mobile device, the sensor data including mobile-device motion-sensor data, wherein the mobile-device motion-sensor data is indicative of motion of the mobile device, and wherein the mobile device is in an inactive state at a time when the sensor data is obtained;
   collecting, by the wearable device, wearable-device motion-sensor data from one or more motion sensors that are local to the wearable device, wherein the wearable-device motion-sensor data is indicative of motion of the wearable device;
   computing, by the wearable device, a correlation metric between the mobile-device motion-sensor data and the wearable-device motion-sensor data;
   determining, based at least in part on whether the correlation metric satisfies a threshold criterion, whether the mobile device has been unstowed; and
   in the event that the mobile device has been unstowed, sending, by the wearable device, an activate message and context information to the mobile device, the activate message indicating that the mobile device should enter an active state that permits user interaction with the mobile device, the context information indicative of a most recent activity of a user interface of the wearable device.

2. The method of claim 1 wherein the context information includes one or more of information descriptive of an alert displayed on the wearable device or information descriptive of a user-interface control operated at the wearable device.

3. The method of claim 1 further comprising:
   determining, by the wearable device, whether the mobile device is in close proximity to the wearable device,
   wherein the activate message is sent only in the event that the mobile device is in close proximity to the wearable device.

4. The method of claim 1 wherein the threshold criterion for the correlation metric is based at least in part on a time elapsed since the most recent activity at the user interface of the wearable device.

5. The method of claim 1 further comprising:
   receiving, from the mobile device, a notification message indicating that the mobile device has detected a candidate unstowing event,
   wherein obtaining the sensor data is performed in response to the notification message.

6. A method for detecting unstowing of a mobile device using a wearable device, the method comprising:
   receiving, at the mobile device, sensor data from the wearable device, the sensor data including wearable-device motion-sensor data, wherein the wearable-device motion-sensor data is indicative of motion of the wearable device;
   collecting, by the mobile device, mobile-device motion-sensor data from one or more motion sensors that are local to the mobile device, wherein the mobile-device motion-sensor data is indicative of motion of the mobile device;
   computing, by the mobile device, a correlation metric between the wearable-device motion sensor data and the mobile-device motion-sensor data;
   determining, based at least in part on whether the correlation metric satisfies a threshold criterion, whether the mobile device has been unstowed; and
   in the event that the mobile device has been unstowed:
      obtaining, from the wearable device, context information indicative of a most recent activity at a user interface of the wearable device; and
      preparing a user interface of the mobile device for a user interaction based at least in part on the context information.

7. The method of claim 6 wherein determining that the mobile device has been unstowed occurs while the mobile device is in an inactive state, the method further comprising, in the event that the mobile device has been unstowed, entering, by the mobile device, an active state.

8. The method of claim 7 wherein entering the active state includes activating a user interface component of the mobile device.

9. The method of claim 7 wherein entering the active state includes unlocking the mobile device.

10. The method of claim 6 wherein the context information includes information descriptive of an alert presented to a user by the wearable device and wherein preparing the user interface of the mobile device includes presenting, at the user interface, a content item pertaining to the alert.

11. The method of claim 6 wherein the context information includes information descriptive of a user input received at the wearable device and wherein preparing the user interface of the mobile device includes preparing the user interface responsive to the user input.

12. The method of claim 6 wherein preparing the user interface includes:

identifying an app based on the context information; and launching the app.

13. The method of claim 12 wherein preparing the user interface further includes configuring a state of the app based on the context information.

14. The method of claim 6 further comprising:
monitoring, by the mobile device, data from the one or more motion sensors to detect a candidate unstowing event; and
requesting sensor data from the wearable device in response to detecting a candidate unstowing event,
wherein the sensor data from the wearable device is received in response to the request.

15. The method of claim 6 further comprising:
determining, by the mobile device, whether the wearable device is in close proximity to the mobile device,
wherein the wearable-device motion-sensor data is compared to the mobile-device motion-sensor data only while the wearable device is in close proximity to the mobile device.

16. A wearable device comprising:
a motion sensor configured to provide local motion data;
a proximity sensor;
a communication interface configured to communicate with a mobile device; and
a processing subsystem coupled to the motion sensor, the proximity sensor, and the communication interface, the processing subsystem configured to:
detect, based on the proximity sensor, that the mobile device is in close proximity to the wearable device, wherein the detection occurs at a time when the mobile device is in an inactive state;
obtain, via the communication interface, motion-sensor data from the mobile device;
collect the local motion data from the motion sensor, wherein the local motion data is indicative of motion of the wearable device;
compute a correlation metric between the motion-sensor data obtained from the mobile device and the local motion data;
determine, based at least in part on the correlation metric, whether the mobile device has been unstowed; and
in the event that the mobile device has been unstowed, send an activation message to the mobile device indicating that the mobile device should enter an active state.

17. The wearable device of claim 16 further comprising:
a user interface component coupled to the processing subsystem and configured to present information to a user and to receive user input,
wherein the processing subsystem is further configured to send context information to the mobile device in the event that the mobile device has been unstowed, the context information reflecting a recent activity at the user interface component.

18. The wearable device of claim 17 wherein the user interface component includes a touchscreen.

19. The wearable device of claim 18 wherein the context information includes information reflecting a most recent alert presented on the touchscreen.

20. The wearable device of claim 18 wherein the context information includes information reflecting a most recent touchscreen input control operated by the user.

* * * * *